US011929036B2

(12) United States Patent
Ota

(10) Patent No.: US 11,929,036 B2
(45) Date of Patent: Mar. 12, 2024

(54) ELECTRO-OPTICAL DEVICE AND ELECTRONIC APPARATUS

(71) Applicant: SEIKO EPSON CORPORATION, Tokyo (JP)

(72) Inventor: Hitoshi Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/126,638

(22) Filed: Mar. 27, 2023

(65) Prior Publication Data

US 2023/0306915 A1 Sep. 28, 2023

(30) Foreign Application Priority Data

Mar. 28, 2022 (JP) ................................ 2022-051342

(51) Int. Cl.
*G09G 3/3275* (2016.01)

(52) U.S. Cl.
CPC ... *G09G 3/3275* (2013.01); *G09G 2300/0842* (2013.01); *G09G 2310/027* (2013.01)

(58) Field of Classification Search
CPC ......... G09G 3/3275; G09G 2300/0842; G09G 2310/027
See application file for complete search history.

(56) References Cited

U.S. PATENT DOCUMENTS

| | | | | |
|---|---|---|---|---|
| 6,420,988 B1 | 7/2002 | Azami et al. | | |
| 7,495,641 B2 * | 2/2009 | Tanaka | G09G 3/3648 | 345/98 |
| 8,519,990 B2 * | 8/2013 | Yamazaki | G09G 3/3688 | 345/98 |
| 8,866,143 B2 * | 10/2014 | Yamazaki | G02F 1/13454 | 257/350 |
| 10,573,219 B2 * | 2/2020 | Morita | G09G 3/2011 | |
| 2021/0327366 A1 * | 10/2021 | Maeda | G09G 3/3291 | |

FOREIGN PATENT DOCUMENTS

| | | |
|---|---|---|
| JP | 2000-341125 A | 12/2000 |
| JP | 2002-190738 A | 7/2002 |

* cited by examiner

*Primary Examiner* — Michael Pervan
(74) *Attorney, Agent, or Firm* — Oliff PLC

(57) ABSTRACT

An electro-optical device includes: a data signal output circuit including a D/A converter circuit; a plurality of terminals; a control circuit supplied with a power supply potential VL from at least one terminal of the plurality of terminals via a first power supply wiring line; and a power supply circuit configured to generate a power supply potential VPL in accordance with potentials AVDD and AVSS supplied via two or more terminals of the plurality of terminals and supply the power supply potential VPL to a second power supply wiring line. The D/A converter circuit includes a plurality of capacitance elements. The first power supply wiring line or the second power supply wiring line is selectively coupled to one portion of the plurality of capacitance elements.

9 Claims, 17 Drawing Sheets

ELECTRO-OPTICAL DEVICE AND ELECTRONIC APPARATUS

The present application is based on, and claims priority from JP Application Serial Number 2022-051342, filed Mar. 28, 2022, the disclosure of which is hereby incorporated by reference herein in its entirety.

BACKGROUND

1. Technical Field

The present disclosure relates to an electro-optical device and an electronic apparatus.

2. Related Art

An electro-optical device including, for example, an organic light-emitting diode (OLED) as a light-emitting element is known. In the electro-optical device, a pixel circuit including, for example, a transistor for causing a current to flow through the light-emitting element is provided at a semiconductor substrate so as to correspond to each pixel of an image to be displayed.

In the electro-optical device, a voltage corresponding to a luminance is applied to a gate node of the transistor through a data line. Specifically, digital data that specifies a luminance is converted into an analog voltage by a (digital-to-analog) D/A converter circuit, and the voltage after the conversion is applied to the gate node of the drive transistor through the data line.

As a technique applied to such a D/A converter circuit, for example, the following technique is known. Specifically, there is known a technique including capacitance elements corresponding to upper bits, capacitance elements corresponding to lower bits, switching elements provided corresponding to the capacitance elements, and a coupling capacitor provided between the other ends of the capacitance elements corresponding to the upper bits and the other ends of the capacitance elements corresponding to the lower bits (see, for example, JP-A-2002-190738). In this technique, the switching elements select a ground potential Gnd or a reference potential Vref according to the bits, and apply the selected potential to one ends of the capacitance elements.

However, the D/A converter circuit configured to apply the ground potential Gnd to the one ends of the capacitance elements is easily affected by noise. This is because the ground potential Gnd is commonly used by circuits other than the D/A converter circuit in the electro-optical device. In the D/A converter circuit, an influence of noise deteriorates the linearity (gradation) of an output voltage and degrades display quality.

Although a configuration is conceivable in which a power supply potential used in the D/A converter circuit is supplied from the outside of the electro-optical device, the electro-optical device having such a configuration requires a terminal for receiving the power supply potential, which consequently increases the area of the semiconductor substrate.

As described above, the electro-optical device needs to have a configuration for not deteriorating the output characteristics of the D/A converter circuit without increasing the area of the semiconductor substrate.

SUMMARY

An electro-optical device according to an aspect of the present disclosure includes a driving circuit including a D/A converter circuit, a plurality of terminals, a first circuit supplied with a first power supply potential from at least one terminal of the plurality of terminals via a first power supply wiring line, and a power supply circuit configured to generate a second power supply potential different from the first power supply potential in accordance with potentials supplied via two or more terminals of the plurality of terminals and supply the second power supply potential to a second power supply wiring line, wherein the D/A converter circuit includes a plurality of capacitance elements, and the first power supply wiring line or the second power supply wiring line is selectively coupled to one portion of the plurality of capacitance elements.

DESCRIPTION OF EXEMPLARY EMBODIMENTS

An electro-optical device according to each embodiment of the present disclosure will be described below with reference to the accompanying drawings. In each of the drawings, dimensions and scale of each part are appropriately different from actual ones. Moreover, the embodiments described below are suitable specific examples, and various technically preferable limitations are applied, but the scope of the disclosure is not limited to these modes unless they are specifically described in the following description as limiting the disclosure.

Figure 1:
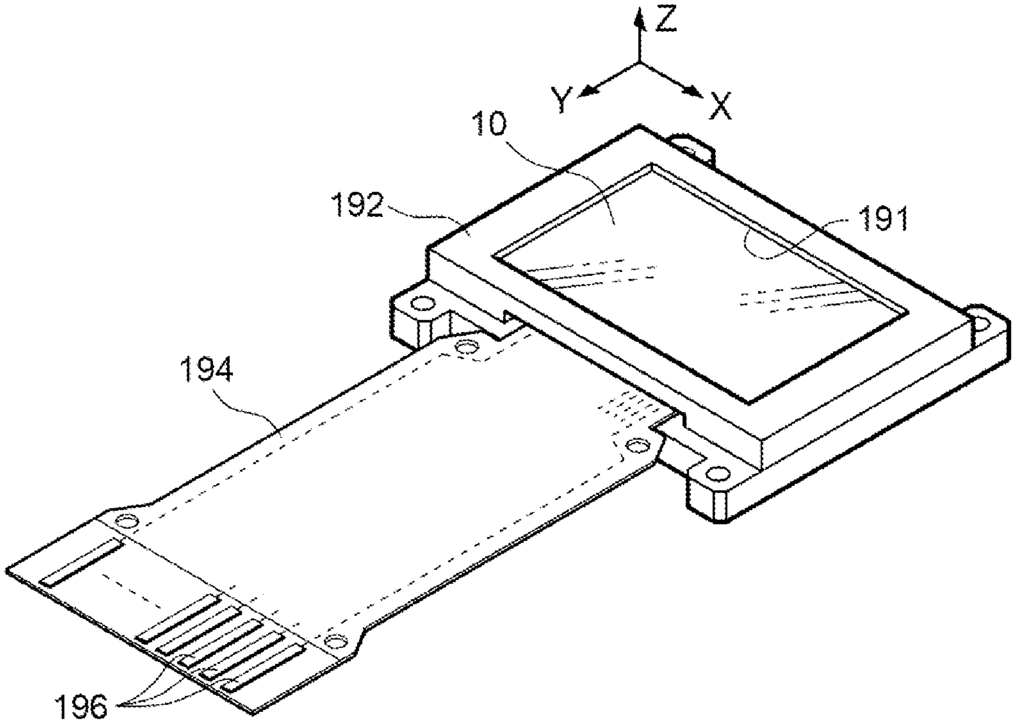
FIG. 1 is a perspective view illustrating an electro-optical device according to a first embodiment.

FIG. 1 is a perspective view illustrating an electro-optical device 10. The electro-optical device 10 is, for example, a micro display panel that displays an image on a head-mounted display or the like. The electro-optical device 10 includes a plurality of pixel circuits, and a driving circuit that drives the pixel circuits. The pixel circuits and the driving circuit are integrated into a semiconductor substrate. The semiconductor substrate is typically a silicon substrate, but may be a different semiconductor substrate.

As illustrated in the drawing, the electro-optical device 10 is accommodated in a frame-shaped case 192 including an opening portion 191. One end of a flexible printed circuit (FPC) board 194 is coupled to the electro-optical device 10. A plurality of terminals 196 are provided at the other end of the FPC board 194. The plurality of terminals 196 are coupled to a host device (not illustrated). The host device supplies video data and various power supply potentials to the electro-optical device 10 via the FPC board 194. The video data is data indicating an image displayed on the electro-optical device 10.

A capacitance element (capacitor) 198 for smoothing a power supply potential generated by the electro-optical device 10 is mounted at the FPC board 194. Note that the capacitance element 198 may be mounted at the host device instead of being mounted at the FPC board 194.

In the drawings, an X direction is a horizontal direction of a display image on the electro-optical device 10, and a Y direction is a vertical direction of the display image. A two-dimensional plane defined by the X direction and the Y direction is a substrate plane of a semiconductor substrate. A Z direction is perpendicular to the X direction and the Y direction and is an emission direction of light emitted from an OLED described below.

Figure 2:
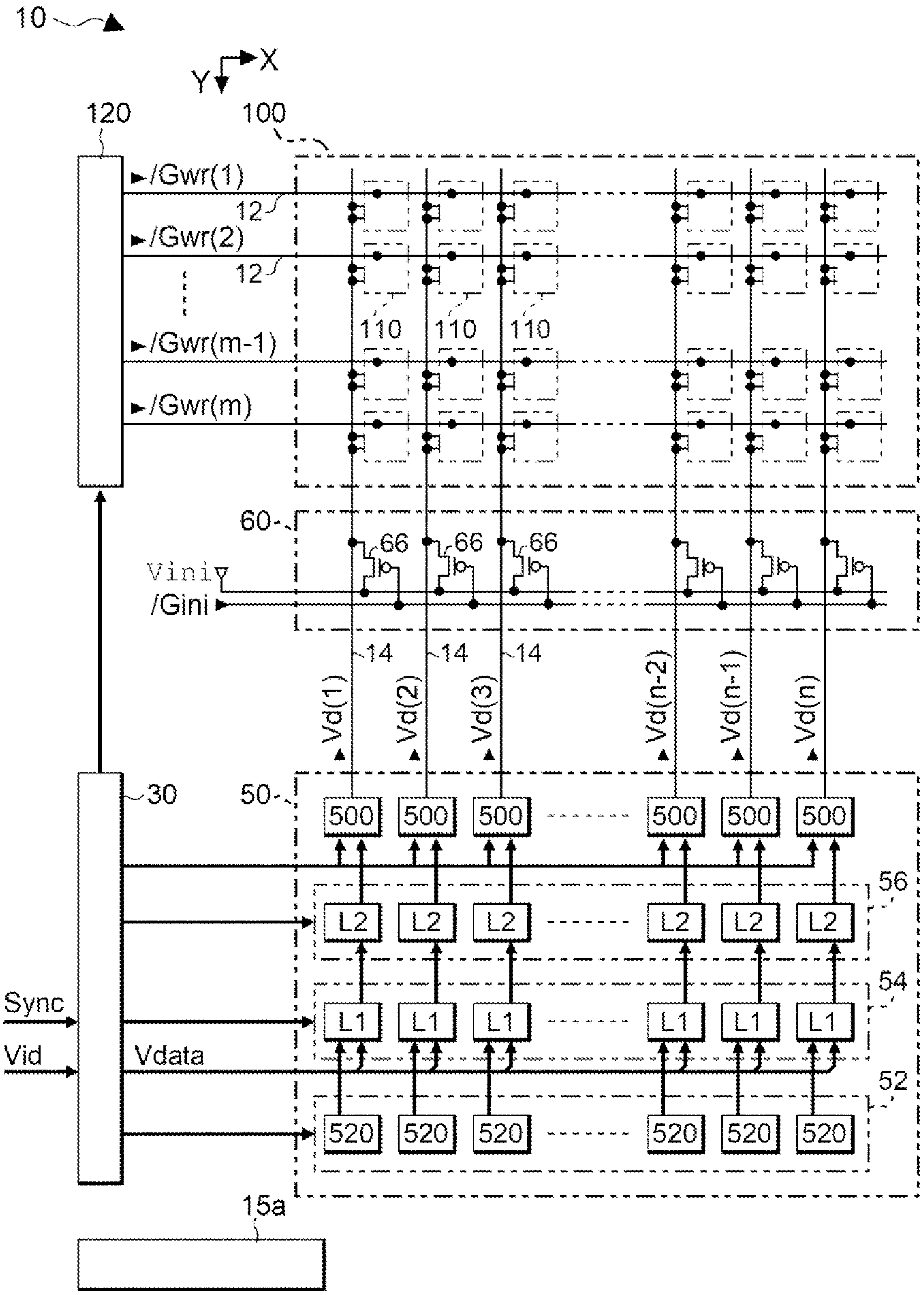
FIG. 2 is a block diagram illustrating an electrical configuration of the electro-optical device.

FIG. 2 is a block diagram illustrating an electrical configuration of the electro-optical device 10. As illustrated in the drawing, the electro-optical device 10 is broadly divided into a power supply circuit 15*a*, a control circuit 30, a data signal output circuit 50, an initialization circuit 60, a display region 100, and a scanning line driving circuit 120.

In the display region 100, scanning lines 12 in m rows are provided in the X direction in the drawing, and data lines 14 in n columns are provided in the Y direction so as to be electrically insulated from the scanning lines 12. Each of m and n is an integer equal to or greater than 2.

Pixel circuits 110 are provided corresponding to intersections between the scanning lines 12 in the M rows and the data lines 14 in the n columns. Thus, the pixel circuits 110 are arranged in a matrix of m vertical rows×n horizontal columns. A region in which the pixel circuits 110 are arranged is an example of the display region 100.

To distinguish the rows from each other in the array of the matrix, the rows may be referred to as first, second, third, . . . , (m−1)-th, and m-th rows in order from the top in the drawing. Similarly, to distinguish the columns from each other in the matrix, the columns may be referred to as first, second, third, . . . , (n−1)-th, and n-th columns in order from the left in the drawing.

An integer i of 1 or more and m or less is used to generalize and explain the scanning lines 12. Similarly, in order to generalize and explain the data lines 14, an integer j of 1 or more and n or less is used.

The control circuit 30 controls each unit based on video data Vid and a synchronization signal Sync supplied from the host device. The video data Vid designates a gradation level of a pixel in an image to be displayed by using, for example, 8 bits for each of the three primary colors.

The synchronization signal Sync includes a vertical synchronization signal that instructs a start of vertical scanning of the video data Vid, a horizontal synchronization signal that instructs a start of horizontal scanning, and a dot clock signal that indicates a timing of one pixel of the video data.

In the embodiment, pixels of an image to be displayed and the pixel circuits 110 in the display region 100 correspond one-to-one with each other but do not need to correspond one-to-one with each other.

Characteristics of a luminance at a gradation level designated by the video data Vid supplied from the host device and characteristics of a luminance of an OLED included in each pixel circuit 110 do not necessarily match each other.

To make the OLED emit light at a luminance corresponding to the gradation level designated by the video data Vid, the control circuit 30 up-converts 8 bits of the video data Vid into, for example, 10 bits in the embodiment and outputs the data as video data Vdata. Thus, the 10-bit video data Vdata is data corresponding to the gradation level designated by the video data Vid.

A look-up table in which a correspondence relationship between the 8 bits of the video data Vid which is an input and the 10 bits of the video data Vdata which is an output is stored in advance is used in the up-conversion. Moreover, the control circuit 30 generates various control signals as logic signals to control each unit, and the details will be described below.

The scanning line driving circuit 120 is a circuit for outputting the various control signals in accordance with control by the control circuit 30 and driving, for each row, the pixel circuits 110 arranged in the m rows and the n columns. For example, the scanning line driving circuit 120 supplies scanning signals /Gwr(1), /Gwr(2), . . . , /Gwr(m−1), and/Gwr(m) to the scanning lines 12 in the first, second, . . . , (m−1)-th, and m-th rows in order. The scanning signal supplied to the scanning line 12 in the i-th row is typically denoted as /Gwr(i). The scanning line driving circuit 120 outputs various control signals in addition to the scanning signals /Gwr(1) to /Gwr(m), and the details will be described later.

The data signal output circuit 50 is a circuit for outputting a data signal having a voltage corresponding to a luminance to the pixel circuits 110 located in a row selected by the scanning line driving circuit 120. In detail, the data signal output circuit 50 includes a selection circuit group 52, a first latching circuit group 54, a second latching circuit group 56, and n D/A converter circuits 500. The selection circuit group 52 includes a selection circuit 520 corresponding to each of the n columns, the first latching circuit group 54 includes a first latching circuit L1 corresponding to each of the n columns, and the second latching circuit group 56 includes a second latching circuit L2 corresponding to each of the n columns.

That is, a set of the selection circuit 520, the first latching circuit L1, the second latching circuit L2, and the D/A converter circuit 500 is provided in correspondence with each column. The selection circuit 520 in the j-th column instructs the first latching circuit L1 in the j-th column to select, among the video data Vdata output from the control circuit 30, video data corresponding to the j-th column. Then, the first latching circuit L1 in the j-th column latches the video data Vdata in accordance with the instruction. The second latching circuit L2 in the j-th column outputs the video data Vdata latched by the first latching circuit L1 in the j-th column to the D/A converter circuit 500 in the j-th column in a writing period described later in accordance with control of the control circuit 30.

The D/A converter circuit 500 in the j-th column converts the 10-bit video data Vdata output from the second latching circuit L2 in the j-th column into a data signal of an analog voltage, and outputs the data signal to the data line 14 in the j-th column. Details of the D/A converter circuit 500 will be described later.

The initialization circuit 60 is an aggregate of transistors 66 provided to correspond one-to-one to the data lines 14. One end of the transistor 66 corresponding to the j-th column is electrically coupled to a power supply wiring line that supplies a power supply potential Vini, and the other end of the transistor 66 is electrically coupled to the data line 14 in the j-th column. A control signal /Gini from the control circuit 30 is supplied in common to gate nodes of the transistors 66 in the respective columns.

In the present description, the expression "electrically coupled" or simply "coupled" means direct or indirect coupling or bonding between two or more elements, and includes, for example, a case in which two or more elements at a semiconductor substrate are not directly coupled but are coupled via different wiring lines through a contact hole.

In the drawing, the potentials of the data lines 14 in the first, second, . . . , (n−1)-th, and n-th columns are denoted as Vd(1), Vd(2), . . . , Vd(n−1), and Vd(n). The potential of the data line 14 in the j-th column is typically denoted as Vd(j).

The power supply circuit 15*a* is an internal power supply of the electro-optical device 10 and generates various power supply potentials and the like. The electro-optical device 10 is provided with various power supply wiring lines.

Figure 3:
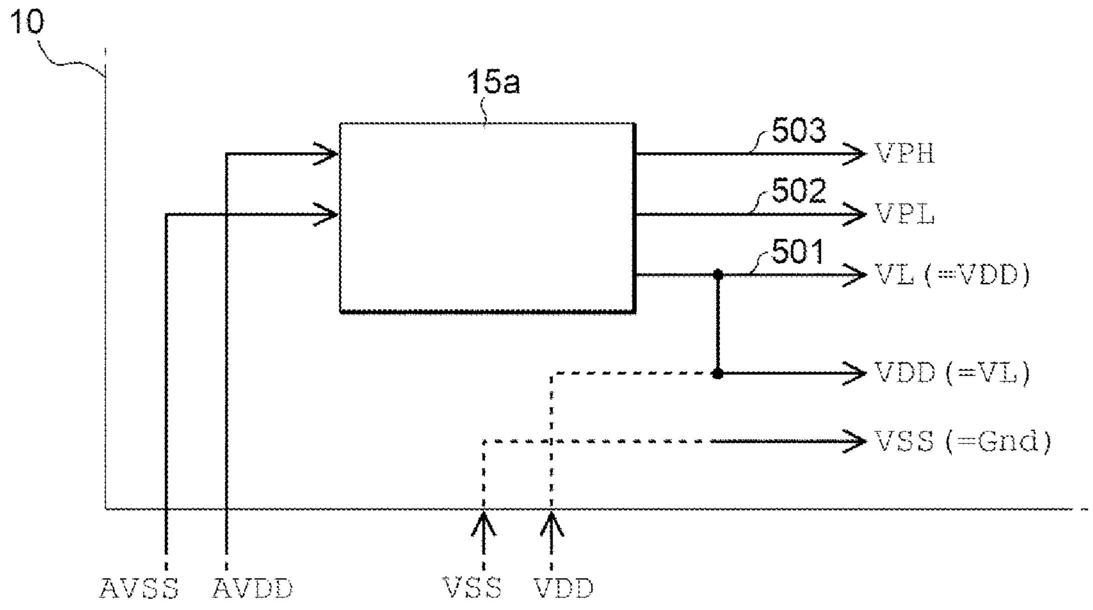
FIG. 3 is a diagram illustrating a power supply circuit of the electro-optical device.

FIG. 3 is a diagram illustrating a relationship between power supply potentials generated by the power supply circuit 15*a* and power supply potentials supplied from the outside of the electro-optical device 10.

As illustrated in this drawing, power supply potentials AVSS, AVDD, VSS and VDD are supplied to the electro-optical device 10 from the outside. Although not illustrated in FIG. 3, power supply potentials Vel and Vct are also supplied to the electro-optical device 10.

The power supply circuit 15*a* generates power supply potentials VL, VPL, and VPH using the power supply potentials AVSS and AVDD. The power supply potential VL is supplied to a power supply wiring line 501, the power supply potential VPL is supplied to a power supply wiring line 502, and the power supply potential VPH is supplied to a power supply wiring line 503. These power supply potentials VL, VPL and VPH are used in the D/A converter circuit 500.

Although not illustrated in FIG. 3, the power supply circuit 15*a* also generates power supply potentials Vini, Vrst, and Vorst.

The power supply potential VSS is a ground potential Gnd and is used as an L level of a logic level. Thus, the power supply potential VSS is commonly used not only in various circuits of the electro-optical device 10 but also in an external circuit, for example, the host device.

The power supply potential VDD is used as an H level of the logic level except for a level shifter described later.

The power supply potential VDD and the power supply potential VL are the same potential in the embodiment. Thus, in the electro-optical device 10, a terminal to which the power supply potential VDD is supplied from the outside is electrically coupled to the power supply wiring line 501.

Note that in the present description, the power supply potential refers to a potential that is substantially constant over time, and the power supply wiring line refers to a wiring line that supplies the power supply potential. The voltage (or potential) refers to a potential difference relative to a ground potential Gnd (=VSS), but may refer to a potential difference between two specific nodes like a threshold voltage described later. Otherwise, the potential and the voltage are not differently used in a strict sense in the present description.

Figure 4:
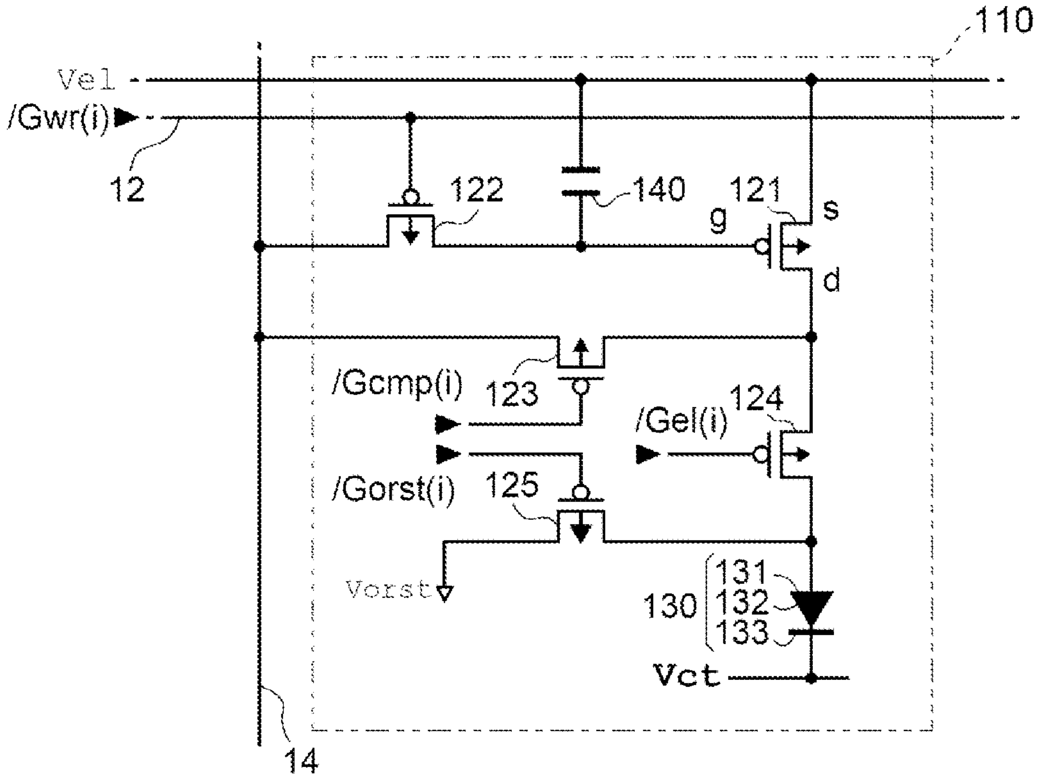
FIG. 4 is a circuit diagram illustrating a pixel circuit of the electro-optical device.

FIG. 4 is a circuit diagram illustrating the pixel circuit 110. The pixel circuits 110 arranged in the m rows and the n columns are electrically identical to each other. Thus, the pixel circuits 110 will be described with one pixel circuit 110 in the i-th row and the j-th column as a representative.

As illustrated in the drawing, the pixel circuit 110 includes an OLED 130, P-channel MOS type transistors 121 to 125, and a capacitance element 140. The transistors 121 to 125 are, for example, metal oxide semiconductor (MOS) field-effect transistors. In addition to the scanning signal /Gwr(i), control signals /Gel(i), /Gcmp(i) /Gorst(i) are supplied from the scanning line driving circuit 120 to each pixel circuit 110 in the i-th row.

The control signal /Gel(i) is a generalized representation of the control signals /Gel(1), /Gel(2), . . . , /Gel(m−1), and /Gel(m) sequentially supplied in correspondence with the first, second, . . . , (m−1)-th, and m-th rows. Similarly, the control signal /Gcmp(i) is a generalized representation of the control signals /Gcmp(1), /Gcmp(2), . . . , /Gcmp(m−1), and /Gcmp(m) sequentially supplied in correspondence with the first, second, . . . , (m−1)-th, and m-th rows. Similarly, the control signal /Gorst(i) is also a generalized representation of the control signals /Gorst(1), /Gorst(2), . . . , /Gorst(m−1), and /Gorst(m) sequentially supplied in correspondence with the first, second, . . . , (m−1)-th, and m-th rows.

The OLED 130 is an example of a light-emitting element in which a light-emitting layer 132 is interposed between a pixel electrode 131 and a common electrode 133. The pixel electrode 131 functions as an anode, and the common electrode 133 functions as a cathode. Note that the common electrode 133 is optically reflective and optically transparent and functions as a semi-reflective semi-transparent layer. When a current flows from the anode to the cathode in the OLED 130, holes injected from the anode and electrons injected from the cathode are recombined in the light-emitting layer 132 to generate excitons, and white light is generated.

In the case of color display, the generated white light resonates in an optical resonator including a reflective layer and a semi-reflective semi-transparent layer (not illustrated) and is emitted at a resonance wavelength set corresponding to any of red (R), green (G), and blue (B). A color filter corresponding to the color is provided on the emission side of the light from the optical resonator. Thus, the emitted light from the OLED 130 is visually recognized by an observer through coloration by the optical resonator and the color filter. The optical resonator is omitted in the drawing. In addition, when the electro-optical device 10 displays a monochrome image expressed in only brightness and darkness, the above color filter is omitted.

In the transistor 121 of the pixel circuit 110 in the i-th row and the j-th column, a gate node g is coupled to a drain node of the transistor 122, a source node s is coupled to a power supply wiring line of the power supply potential Vel, and a drain node d is coupled to a source node of the transistor 123 and a source node of the transistor 124. In the capacitance element 140, one end is coupled to the gate node g of the transistor 121, and the other end is coupled to the power supply wiring line of the power supply potential Vel. Thus, the capacitance element 140 holds the voltage between the gate node g and the source node s of the transistor 121.

Note that the other end of the capacitance element 140 may be coupled to a power supply wiring line other than the power supply wiring line of the power supply potential Vel as long as the potential is kept substantially constant.

In the embodiment, for example, a so-called MOS capacitor formed by interposing a gate insulation layer of a transistor between a semiconductor layer and a gate electrode layer of the transistor is used as the capacitance element 140. Here, as the capacitance element 140, a parasitic capacitor of the gate node g of the transistor 121 may be used, and a so-called metal capacitor formed by interposing an insulating layer between mutually different conductive layers at a semiconductor substrate may be used.

In the transistor 122 of the pixel circuit 110 in the i-th row and the j-th column, a gate node is coupled to the scanning line 12 in the i-th row, and a source node is coupled to the data line 14 in the j-th column. In the transistor 123 of the pixel circuit 110 in the i-th row and the j-th column, the control signal /Gcmp(i) is supplied to a gate node, and a drain node is coupled to the data line 14 in the j-th column. In the transistor 124 of the pixel circuit 110 in the i-th row and the j-th column, the control signal /Gel(i) is supplied to a gate node, and a drain node is coupled to the pixel electrode 131 serving as the anode of the OLED 130 and a drain node of the transistor 125. In the transistor 125 of the pixel circuit 110 in the i-th row and the j-th column, the control signal /Gorst(i) is supplied to a gate node, and a source node is coupled to a power supply wiring line of the power supply potential Vorst.

The power supply potential Vorst is, for example, the ground potential Gnd or a potential close to the ground potential Gnd. Specifically, the power supply potential Vorst is such a potential that a current does not flow through the OLED 130 when the power supply potential Vorst is supplied to the pixel electrode 131 of the OLED 130. The power supply potential Vct is supplied to the common electrode 133 functioning as the cathode of the OLED 130 via a power supply wiring line.

Figure 5:
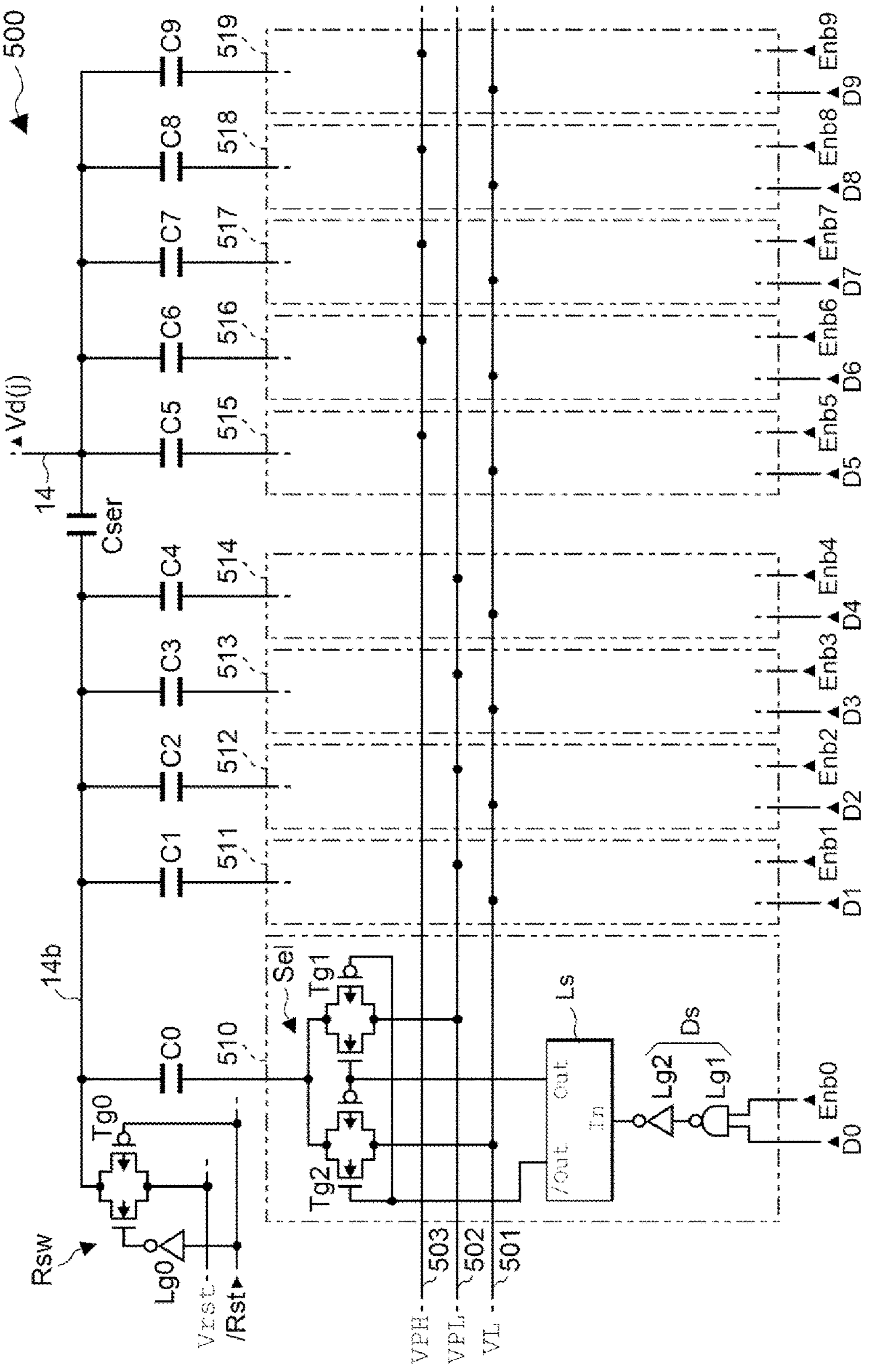
FIG. 5 is a circuit diagram illustrating a D/A converter circuit of the electro-optical device.

FIG. 5 is a circuit diagram illustrating the D/A converter circuit 500 corresponding to the j-th column.

Bits D0 to D9 are supplied from the second latching circuit L2 in the j-th column to the D/A converter circuit 500 in the j-th column. Further, control signals Enb0 to Enb9 and a control signal /Rst are supplied from the control circuit 30 to the D/A converter circuit 500 in the j-th column. In addition to the power supply potential Vrst, the power supply potentials VL, VPL, and VPH are supplied from the power supply circuit 15*a* to the D/A converter circuit 500 in each column via the power supply wiring lines 501, 502, and 503 in this order.

In the first embodiment, the power supply potential VPH is, for example, 4.7 volts, the power supply potential VPL is, for example, 3.0 volts, and the power supply potential VL (=VDD) is, for example, 1.8 volts.

The bits D0 to D9 are 10 bits of the video data Vdata output from the second latching circuit L2 in the j-th column and are converted by the D/A converter circuit 500. Among the 10 bits, the least significant bit is D0, the weight increases in the order of the bits D0, D1, D2, . . . , and the most significant bit is D9.

The control signals Enb0 to Enb9 are signals for sequentially specifying timings of capturing the bits D0 to D9. The control signal /Rst is a signal for resetting the capacitance elements.

As illustrated in the drawing, the D/A converter circuit 500 includes capacitance elements C0 to C9 and Cser, a switch Rsw, and selection circuits 510 to 519. The capacitance elements C0 to C9 and the selection circuits 510 to 519 are paired as follows so as to correspond to the respective bits. In detail, the selection circuit 510 and the capacitance element C0 are paired to correspond to the bit D0, the selection circuit 511 and the capacitance element C1 are paired to correspond to the bit D1, the others are similarly paired, and the selection circuit 519 and the capacitance element C9 are paired to correspond to the bit D9.

In the embodiment, among the 10 bits of the video data Vdata, the bits D5 to D9 are upper bits, and the bits D0 to D4 are lower bits.

The selection circuits 510 to 514 corresponding to the lower bits select the power supply potential VL or VPL and supply the selected power supply potential to one ends of the capacitance elements. Further, the selection circuits 515 to 519 corresponding to the upper bits select the power supply potential VL or VPH and supply the selected power supply potential to one ends of the capacitance elements.

For example, the selection circuit 510 corresponding to the bit D0 captures the bit D0 at a timing designated by the control signal Enb0, selects the power supply potential VL or VPL in accordance with the logic level of the captured bit D0, and supplies the selected power supply potential to one end of the capacitance element C0. For example, the selection circuit 516 corresponding to the bit D6 captures the bit D6 at a timing designated by the control signal Enb6, selects the power supply potential VL or VPH in accordance with the logic level of the captured bit D6, and applies the selected power supply potential to one end of the capacitance element C6.

The capacitance values of the capacitance elements C0 to C9 have the following ratios in the embodiment. In detail, assuming that the capacitance value of the capacitance element C0 is "1", the capacitance values of the capacitance elements C2, C3, C4, C5, C6, C7, C8, and C9 are "2", "4", "8", "16", "1", "2", "4", "8", and "16" in this order.

The weights of the bits D0 to D9 are "1", "2", "4", "8", "16", "32", "64", "128", "256", and "512" in this order considering the whole 10 bits. Thus, the capacitance values of the capacitance elements C0 to C9 are not in a manner similar to the weights. However, in a case where the bits D0 to D9 are divided into the lower bits D0 to D4 and the upper bits D5 to D9, when the bit D5 is regarded as the least significant bit among the bits D5 to D9 and the weight is regarded as "1", the weights of the bits D5 to D9 are "1", "2", "4", "8", and "16" in this order. In the present description, to consider a case where the bits D0 to D9 are divided into the lower bits D0 to D4 and the upper bits D5 to D9, the capacitance elements C0 to C9 are expressed as having capacitance values corresponding to the weights of the bits D0 to D9.

The capacitance value of the capacitance element Cser is "1" in the embodiment. Note that a certain degree of error of the capacitance values of the capacitance elements C0 to C9 and Cser are allowed as long as the linearity is maintained.

In the embodiment, since a MOS capacitor is used as the capacitance element 140 of each pixel circuit 110, a MOS capacitor may also be used as the capacitance elements C0 to C9 and Cser, but a metal capacitor may also be used.

The other ends of the capacitance elements C0 to C4 corresponding to the lower 5 bits among the capacitance elements C0 to C9 are electrically coupled to one end of the capacitance element Cser. For convenience, a coupling line between the other ends of the capacitance elements C0 to C4 and the one end of the capacitance element Cser is referred to as a relay line 14*b*. In addition, among the capacitance elements C0 to C9, the other ends of the capacitance elements C5 to C9 corresponding to the upper 5 bits are electrically coupled to the data line 14, which is an output terminal Out of the D/A converter circuit 500, and the other end of the capacitance element Cser.

The switch Rsw is brought into the ON state or the OFF state according to the control signal /Rst between a power supply wiring line of the power supply potential Vrst and the relay line 14*b*. In detail, the switch Rsw is brought into the ON state when the control signal /Rst is at the L level, and brought into the OFF state when the control signal /Rst is at the H level.

In the present description, the "ON state" of the switch, the transmission gate, or the transistor means that both terminals of the switch, both terminals of the transmission gate, or the source node and the drain node of the transistor are electrically closed and are in a low impedance state. Moreover, the "OFF state" of the switch, the transmission gate, or the transistor means that both terminals of the switch, both terminals of the transmission gate, or the source node and the drain node of the transistor are electrically open and are in a high impedance state.

The switch Rsw may include a NOT circuit Lg0 for outputting a negative signal of the control signal /Rst and a transmission gate Tg0. The transmission gate Tg0 is an analog switch obtained by combining an n-type transistor including a gate node supplied with the negative signal from the NOT circuit Lg0 and a p-type transistor including a gate node supplied with the control signal /Rst.

The selection circuit 510 paired with the capacitance element C0 includes an AND circuit Ds, a level shifter Ls, and a selector Sel. The AND circuit Ds outputs a logical product signal of the bit D0 of the video data Vdata output from the second latching circuit L2 in the j-th column and the control signal Enb0 supplied from the control circuit 30. As illustrated in the drawing, the AND circuit Ds actually includes a NAND circuit Lg1 for outputting a negative logical product signal of the bit D0 and the control signal Enb0, and a NOT circuit Lg2 for outputting a negative signal of the negative logical product signal.

The level shifter Ls converts the logical amplitude of the logical product signal output from the AND circuit Ds, outputs, from the output terminal Out, a non-inverted signal in which the logic level of the logical product signal is maintained, and outputs, from the output terminal/Out, an inverted signal in which the logic level of the logical product signal is inverted.

In the first embodiment, although a power supply of the level shifter Ls is not particularly illustrated, a high power supply potential is the power supply potential VPH and a low power supply potential is the power supply potential VL (or VSS). Thus, in the first embodiment, the H level of the non-inverted signal or the inverted signal output from the level shifter Ls is the power supply potential VPH, and the L level thereof is the power supply potential VL (or VSS).

The selector Sel of the selection circuit 510 selects the power supply potential VPL when the non-inverted signal output from the level shifter Ls is at the H level and the inverted signal is at the L level. That is, the selector Sel selects the power supply potential VPL when the bit D0 is "1" (H level) and the control signal Enb0 is at the H level.

The selector Sel selects the power supply potential VL when the non-inverted signal output from the level shifter Ls is at the L level and the inverted signal is at the H level. That is, the selector Sel selects the power supply potential VL when the bit D0 is "0" (L level) or the control signal Enb0 is at the L level.

The selector Sel actually includes a transmission gate Tg1 provided between the power supply wiring line of the power supply potential VPL and the one end of the capacitance element C0, and a transmission gate Tg2 provided between the power supply wiring line of the power supply potential VL and the one end of the capacitance element C0.

In this configuration, when the non-inverted signal output from the level shifter Ls is at the H level and the inverted signal is at the L level, the transmission gate Tg1 is brought into the ON state and the transmission gate Tg2 is brought into the OFF state. Thus, the power supply potential VPL is supplied to the one end of the capacitance element C0. In this configuration, when the non-inverted signal output from the level shifter Ls is at the L level and the inverted signal is at the H level, the transmission gate Tg1 is brought into the OFF state and the transmission gate Tg2 is brought into the ON state. Thus, the power supply potential VL is supplied to the one end of the capacitance element C0.

Although the selection circuit 510 paired with the capacitance element C0 has been described here, the other selection circuits 511 to 514 corresponding to the lower bits have the same configuration as the selection circuit 510 except that the bits of the input signal and the control signals are different, i.e., the bits D1 to D4 of the input signal and the control signals Enb1 to Enb4. Thus, in the selection circuits 510 to 514, the one ends of the capacitance elements C0 to C4 are configured to be selectively coupled to the power supply wiring line 501 or 502.

The selection circuits 515 to 519 corresponding to the upper bits have the same configuration as the selection circuits 510 to 514 except that the power supply potential VPH is selected when the non-inverted signal output from the level shifter Ls is at the H level and the inverted signal is at the L level, and that the bits of the input signal and the control signals are different, i.e., the bits D5 to D9 of the input signal and the control signals Enb5 to Enb9. Thus, in the selection circuits 515 to 519, the one ends of the capacitance elements C5 to C9 are configured to be selectively coupled to the power supply wiring line 501 or 503.

Figure 6:
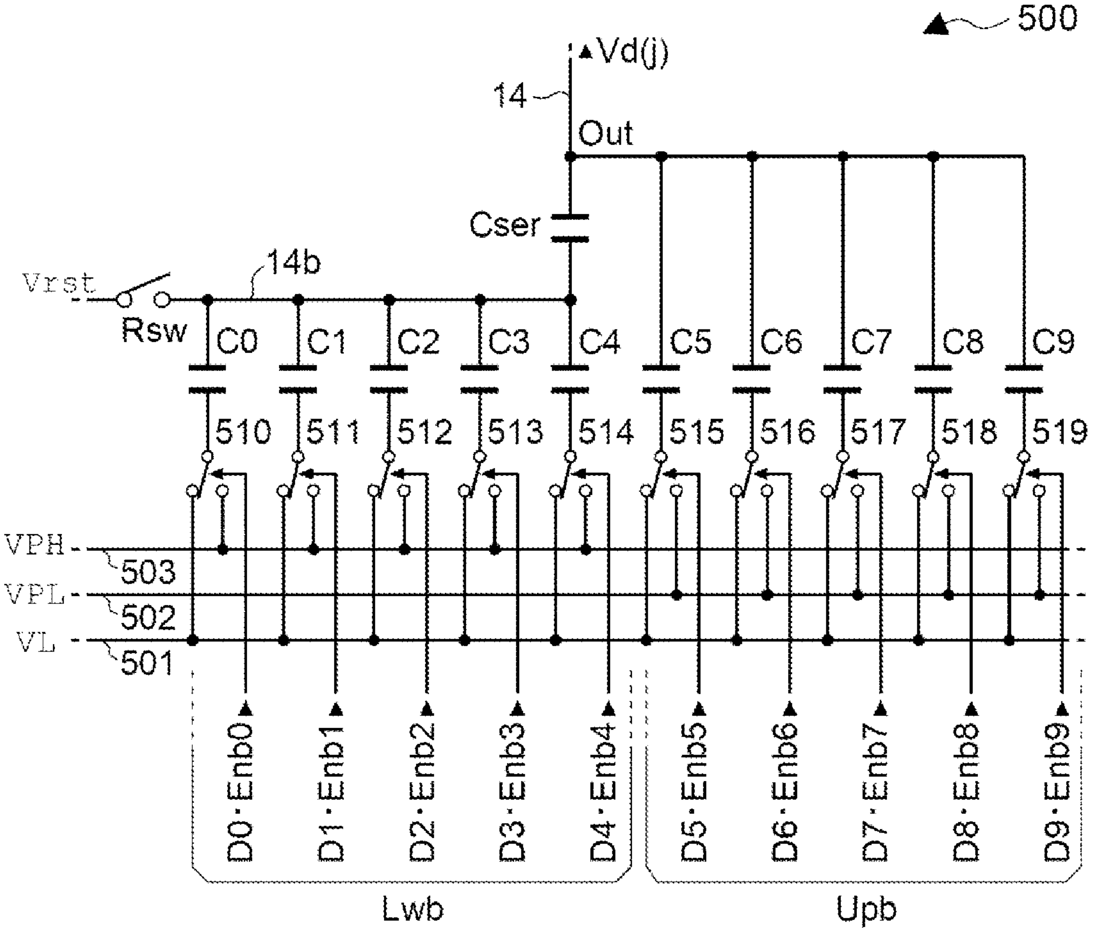
FIG. 6 is a diagram illustrating an equivalent circuit of the D/A converter circuit.

FIG. 6 is a diagram illustrating an equivalent circuit of the D/A converter circuit 500 in the j-th column.

The selection circuit 510 is represented as a single-pole double-throw switch that selects the power supply potential VL when the logical product signal (D0·Enb0) of the bit D0 and the control signal Enb0 is at the L level and selects the power supply potential VPL when the logical product signal is at the H level. The selection circuits 511 to 514 are also represented as the same single-pole double-throw switches as the selection circuit 510.

The selection circuit 515 is represented as a single-pole double-throw switch that selects the power supply potential VL when the logical product signal (D5·Enb5) of the bit D5 and the control signal Enb5 is at the L level and selects the power supply potential VPH when the logical product signal is at the H level. The selection circuits 516 to 519 are also represented as the same single-pole double-throw switches as the selection circuit 515.

Although the D/A converter circuit 500 in the j-th column has been described in FIGS. 5 and 6, the D/A converter circuits 500 in the other columns have the same configuration.

An operation of the D/A converter circuit 500 is divided into an operation in a reset period and an operation in an output period. The reset period of the D/A converter circuit 500 corresponds to an initialization period (a) and a compensation period (b) of an operation period of the electro-optical device 10 described later, and the output period of the D/A converter circuit 500 corresponds to a writing period (c) of the operation period of the electro-optical device 10.

In the reset period of the D/A converter circuit 500, the switch Rsw is brought into the ON state, and the selection circuits 510 to 519 each select the power supply potential VL. In addition, at the final part of the reset period, the data line 14, which is the output terminal Out, has substantially the same potential as the power supply potential Vrst by an element not illustrated in FIGS. 5 and 6, specifically, an average threshold equivalent potential of the transistors 121 of the respective columns. Thus, charges corresponding to the capacitance values are accumulated in the capacitance elements C0 to C9.

In the output period of the D/A converter circuit 500, the selection circuits 510 to 514 each maintain the selection of the power supply potential VL when the corresponding logical product signal is at the L level, and select the power supply potential VPL when the corresponding logical product signal is at the H level. In the output period, the selection circuits 515 to 519 each maintain the selection of the power supply potential VL when the corresponding logical product signal is at the L level, and select the power supply potential VPH when the corresponding logical product signal is at the H level. As described later, since the control signals Enb0 to Enb9 are at the H level at the final part of the output period, the selection circuits 510 to 519 select the power supply potential VL or VPL (or VPH) in accordance with the logic levels of the bits D0 to D9. That is, in the output period, the potentials at the one ends of the capacitance elements C0 to C9 are changed (increased) or maintained in accordance with the bits D0 to D9. Thus, at the other end of each of the capacitance elements C0 to C9 in which the potential of the one end has changed, the potential increases from the potential at the final part of the reset period in accordance with the capacitance value due to discharge of the accumulated charge.

As described above, in the first embodiment, the power supply potential VPH is 4.7 volts, the power supply potential VPL is 3.0 volts, and the power supply potential VL is 1.8 volts. Thus, in the first embodiment, the voltage change (VPL−VL) at the one end of each of the capacitance elements C0 to C4 when the corresponding bit is "1" is 1.2 volts. In addition, the voltage change (VPH−VL) at the one end of each of the upper capacitance elements C5 to C9 when the corresponding bit is "1" is 2.9 volts.

At the other ends of the capacitance elements C5 to C9 corresponding to the upper bits, the potential of the data line 14 increases in accordance with the capacitance values. In contrast, since the relay line 14*b*, which is the other end of each of the capacitance elements C0 to C4 corresponding to the lower bits, is coupled to the data line 14 via the capacitance elements Cser, the voltage change of the relay line 14*b* is compressed at a ratio determined based on the capacitance elements C0 to C4 and Cser, and the potential of the data line 14 is changed. When this ratio is denoted as a compression ratio k, the compression ratio k is expressed by Equation 1 below.

$$K=C\text{ser}/(C\text{ser}+C0+C1+C2+C3+C4) \tag{1}$$

In the first embodiment, the compression ratio k is 1/32 (=1/(1+1+2+4+8+16)).

In FIG. 6, when a circuit including the capacitance elements C5 to C9 and the selection circuits 515 to 519 is referred to as an upper D/A converter circuit unit Upb, the upper D/A converter circuit unit Upb outputs a voltage corresponding to the bits D5 to D9 to the data line 14.

When a circuit including the capacitance elements C0 to C4 and the selection circuits 510 to 514 is referred to as a lower D/A converter circuit unit Lwb, the lower D/A converter circuit unit Lwb outputs a voltage corresponding to the bits D0 to D4 to the relay line 14*b*. However, the voltage change of the relay line 14*b* is compressed at the compression ratio k of 1/32 and propagated to the data line 14.

Thus, even when the bits D0 to D4 are the same as the bits D5 to D9 in this order, the voltage change of the data line 14 by the lower D/A converter circuit unit Lwb is 1/32 of the voltage change of the data line 14 by the upper D/A converter circuit unit Upb.

Thus, considering all of the upper D/A converter circuit unit Upb and the lower D/A converter circuit unit Lwb, the D/A converter circuit 500 changes the voltage of the data line 14 from the voltage at the final part of the reset period by a voltage corresponding to the weights of the bits D0 to D9.

Figure 7:
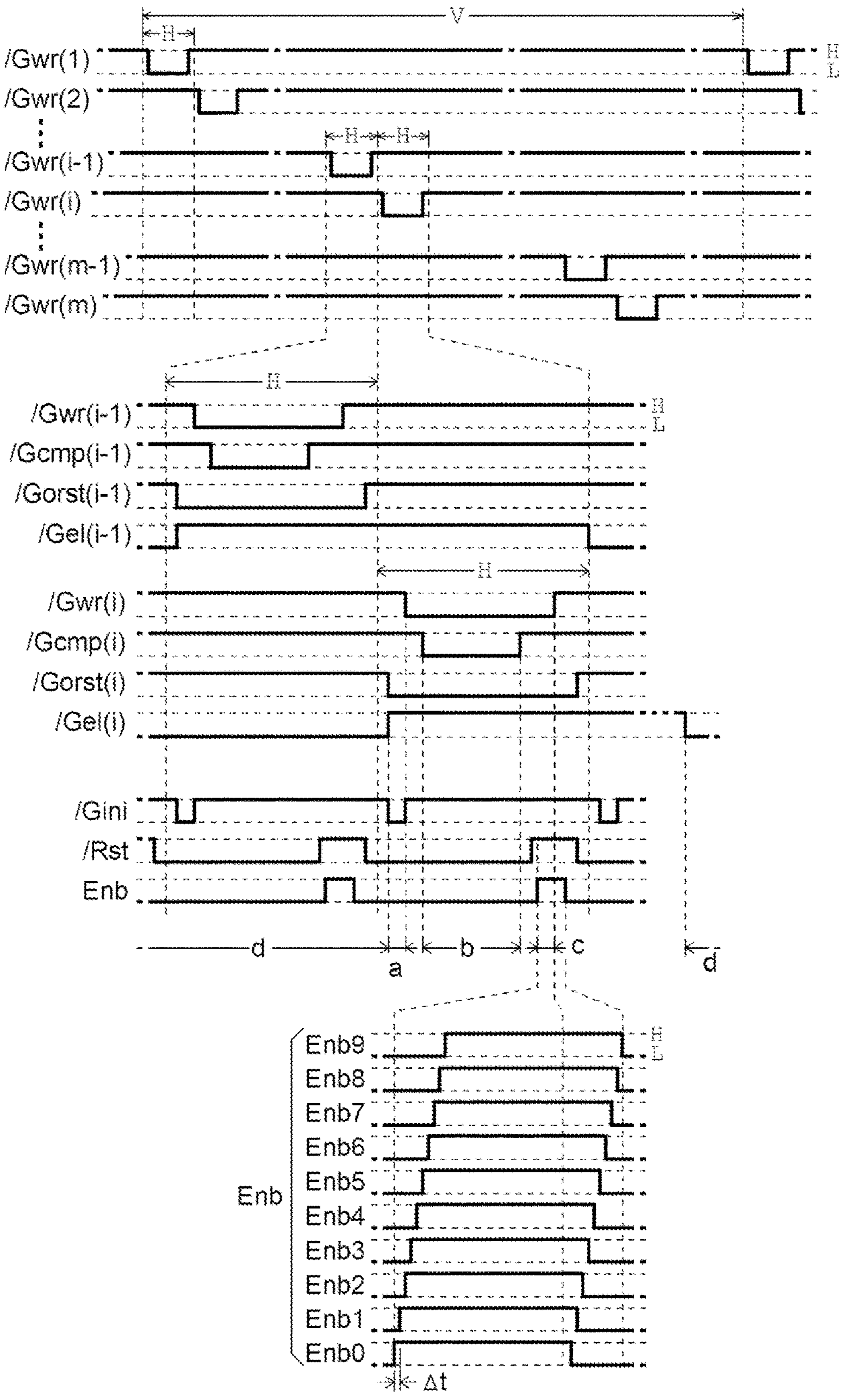
FIG. 7 is a timing chart illustrating an operation of the electro-optical device.

FIG. 7 is a timing chart for describing an operation of the electro-optical device 10.

In the electro-optical device 10, the scanning lines 12 in the m rows are scanned one by one in the order of first, second, third, . . . , m-th rows during a period of a frame (V). Specifically, as illustrated in the drawing, the scanning signals /Gwr(1), /Gwr(2), . . . , /Gwr(m−1), and /Gwr(m) are successively and exclusively reaches the L level for each horizontal scanning period (H) by the scanning line driving circuit 120.

In the embodiment, a period during which the adjacent scanning signals among the scanning signals /Gwr(1) to /Gwr(m) reach the L level is temporally isolated. Specifically, after the scanning signal /Gwr(i−1) changes from the L level to the H level, the next scanning signal /Gwr(i) reaches the L level after a period of time. This period corresponds to a horizontal retrace period.

In the present description, the period of one frame (V) refers to a period required to display one frame of an image designated by the video data Vid. In a case in which a length of the period of one frame (V) is the same as a vertical synchronization period, for example, when a frequency of a vertical synchronization signal included in the synchronization signal Sync is 60 Hz, the length is 16.7 milliseconds which corresponds to one cycle of the vertical synchronization signal. In addition, the horizontal scanning period (H) is an interval of time in which the scanning signals /Gwr(1) to /Gwr(m) reach the L level in order, but in the drawing, for convenience, a start timing of the horizontal scanning period (H) is approximately a center of the horizontal retrace period.

In the electro-optical device 10, one horizontal scanning period (H) is mainly divided into three periods of the initialization period (a), the compensation period (b), and the writing period (c). In addition to the above three periods, an operation in a light emission period (d) is further added as an operation of the pixel circuit 110.

In the initialization period (a) of each horizontal scanning period (H), the control signal /Gini is at the L level, the control signal /Rst is at the L level, and the control signal Enb is at the L level. Note that the control signals Enb0 to Enb9 are collectively referred to as the control signals Enb. The control signals Enb0 to Enb9 are sequentially shifted in phase in the writing period (c) as described later, but have the same waveform in the other periods, and thus these signals are collectively referred to as the control signals Enb in this manner.

In the compensation period (b), the control signal /Gini is at the H level, and the control signals /Rst and Enb are maintained at the L level.

In the writing period (c), the control signal /Gini is maintained at the H level, and the control signals /Rst and Enb become at the H level.

Next, an operation in the horizontal scanning period H will be described with the i-th row as an example. Moreover, the pixel circuit 110 in the i-th row and the j-th column will be described as an example of the pixel circuit 110.

In the horizontal scanning period (H) of the i-th row, the initialization period (a) of the i-th row starts before the scanning signal /Gwr(i) becomes at the L level. The initialization period (a) is a period for resetting the charge remaining in each unit in the horizontal scanning period (H) of the (i−1)-th row.

Figure 8:
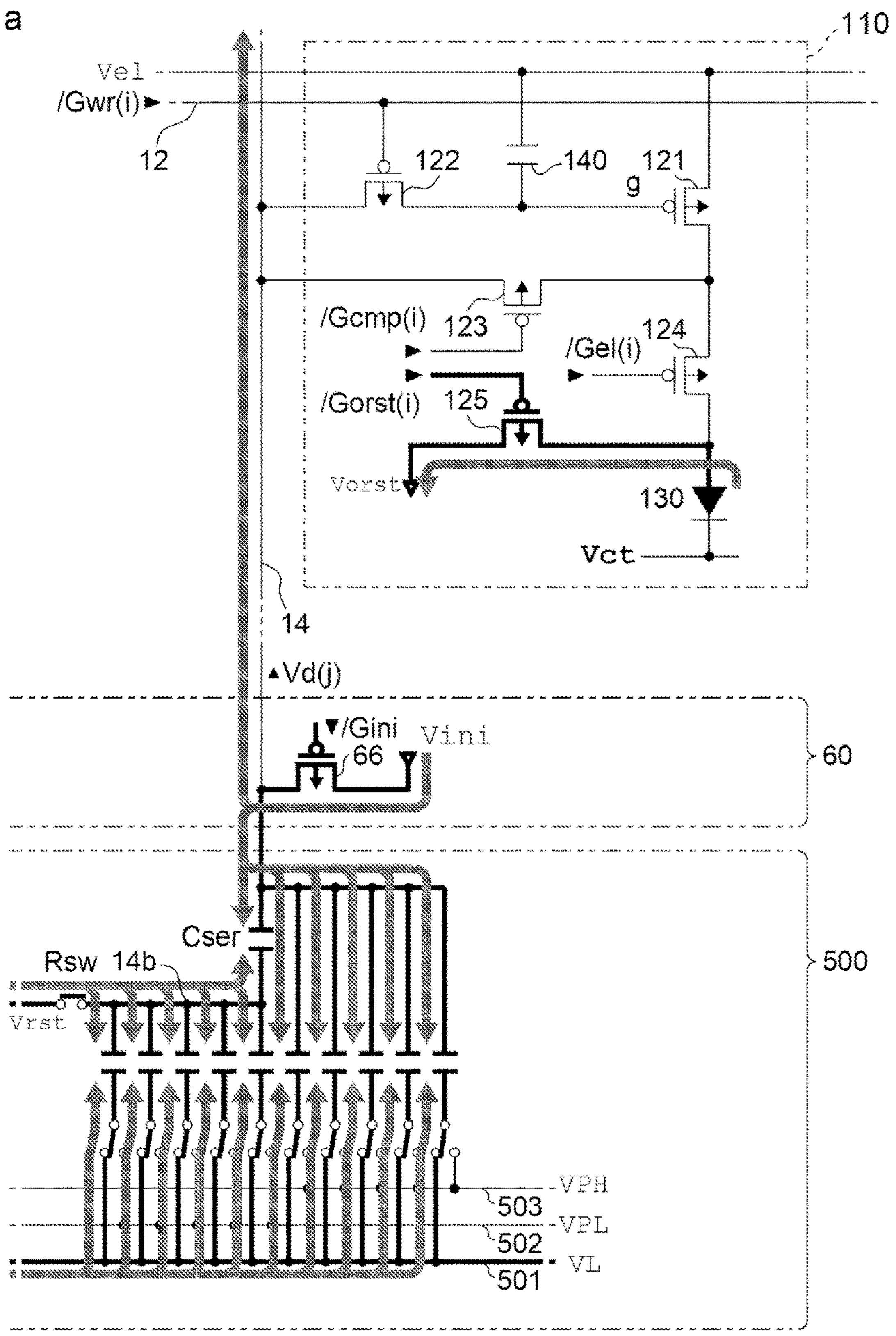
FIG. 8 is a diagram for describing an operation of the electro-optical device.

FIG. 8 is a diagram for describing an operation of the pixel circuit 110 in the i-th row and the j-th column and the D/A converter circuit 500 corresponding to the data line 14 in the j-th column in the initialization period (a) of the i-th row.

In the initialization period (a), the control signal /Gini becomes at the L level and thus the transistor 66 is brought into the ON state. Consequently, the potential of the data line 14 is initialized to the power supply potential Vini.

Further, in the initialization period (a), the control signal /Rst becomes at the L level and thus the switch Rsw is brought into the ON state. Consequently, the relay line 14*b* has the power supply potential Vrst. In the initialization period (a), since the control signals Enb are at the L level, the logical product signals of the AND circuits Ds of the selection circuits 510 to 519 become at the L level regardless of the logic levels of the bits D0 to D9 output from the second latching circuits L2. Thus, the selection circuits 510 to 519 each select the power supply potential VL.

Thus, in the initialization period (a), as illustrated in FIG. 8, the one ends of the capacitance elements C0 to C9 has the power supply potential VL, the one end of the capacitance element Cser and the other ends of the capacitance elements C0 to C4 have the power supply potential Vrst, and the other end of the capacitance element Cser and the other ends of the capacitance elements C5 to C9 have the power supply potential Vini via the data line 14. In this manner, in the initialization period (a), the charges accumulated in the capacitance elements C0 to C9 and Cser are initialized together with the initialization of the data line 14.

In addition, in the initialization period (a) of the i-th row, the control signal /Gel(i) becomes at the H level, and the control signal /Gorst(i) becomes at the L level. Thus, in each pixel circuit 110 in the i-th row, the transistor 124 is brought into the OFF state and the transistor 125 is brought into the ON state. Thus, the pixel electrode 131 serving as the anode of the OLED 130 has the power supply potential Vorst. Thus, the OLED 130 is turned off, and the potential of the pixel electrode 131 is reset to the power supply potential Vorst.

Because a capacitance is parasitic in the OLED 130, the pixel electrode 131 is reset for elimination of an influence of the charge accumulated as the parasitic capacitance in the immediately preceding light emission period.

After the initialization period (a) is finished, the compensation period (b) starts. The compensation period (b) is a period for converging the potential of the gate node g of each transistor 121 to the potential equivalent to the threshold voltage of the transistor 121 in the n pixel circuits 110 located in the i-th row.

Figure 9:
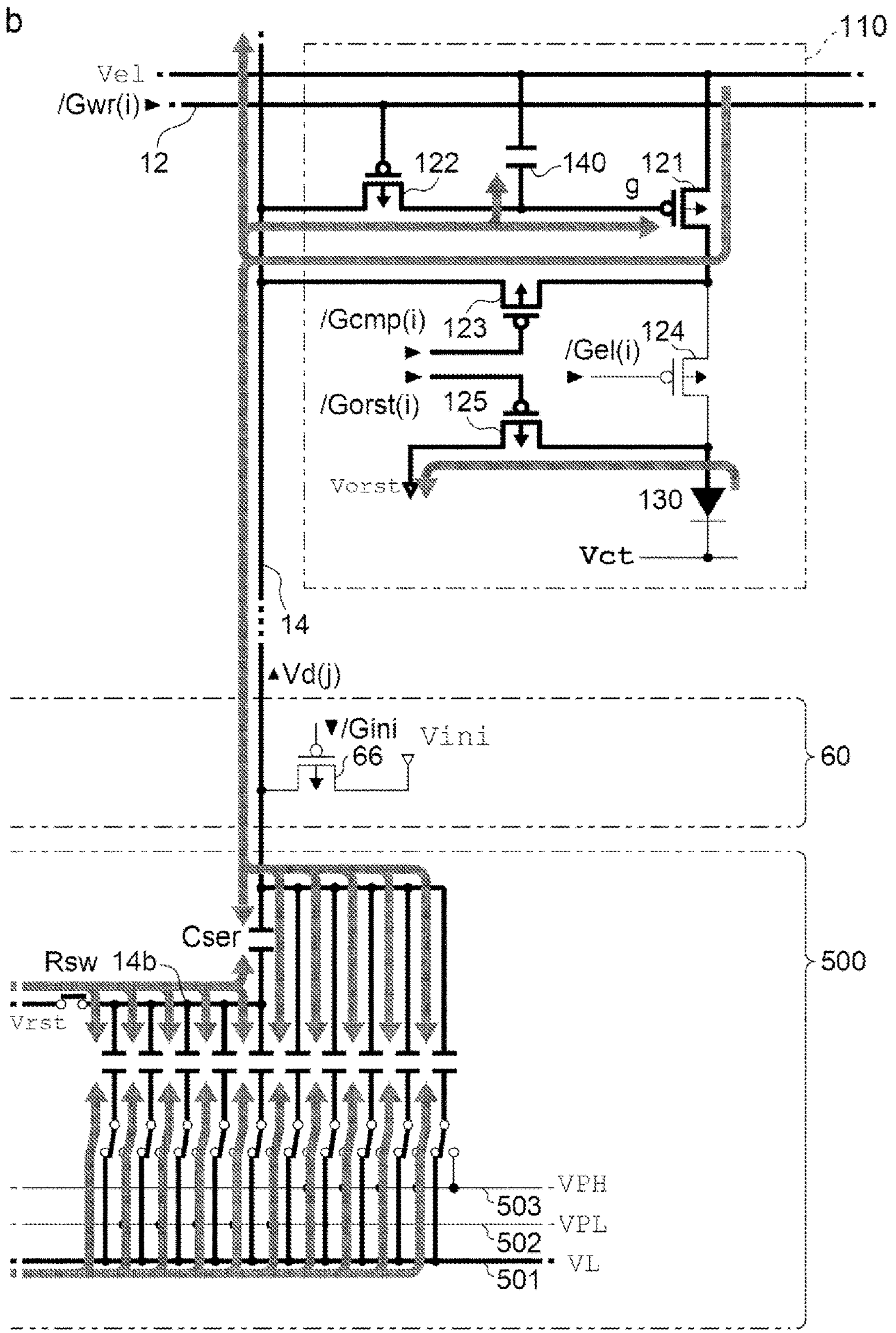
FIG. 9 is a diagram for describing an operation of the electro-optical device.

FIG. 9 is a diagram for describing an operation of the pixel circuit 110 in the i-th row and the j-th column and the D/A converter circuit 500 corresponding to the data line 14 in the j-th column in the compensation period (b) of the i-th row.

In the compensation period (b), the control signal /Gini becomes at the H level, and thus the transistor 66 is brought into the OFF state. In the compensation period (b), since the control signal /Rst is at the L level, the ON state of the switch Rsw is maintained, and since the control signals Enb are at the L level, the selection of the power supply potential VL by the selection circuits 510 to 519 is maintained.

In addition, in the compensation period (b) of the i-th row, the scanning signal /Gwr(i) becomes at the L level, and the control signal /Gcmp(i) becomes at the L level in a state where the scanning signal /Gwr(i) is at the L level. Thus, in each pixel circuit 110 in the i-th row, the transistor 122 is brought into the ON state and the transistor 123 is brought into the ON state. Thus, since the transistor 121 is in a diode-coupled state, the voltage between the gate node and the source node of the transistor 121 converges so as to approach the threshold voltage Vth of the transistor 121. Thus, the potential of the gate node approaches a potential (Vel−Vth) corresponding to the threshold voltage Vth. Note that this potential (Vel−Vth) is referred to as a threshold equivalent potential for convenience.

In the compensation period (b) of the i-th row, since the transistors 122 and 123 of the pixel circuit 110 are in the ON state, the potentials of the other end of the capacitance element Cser and the other ends of the capacitance elements C5 to C9 also approach the threshold equivalent potential via the data line 14.

At the start of the compensation period (b), a current needs to flow from the source node to the drain node in the diode-coupled transistor 121. Thus, the power supply potential Vini supplied to the gate node g in the initialization period (a) before the compensation period (b) satisfies the following relationship:

$$Vini<Vel-Vth.$$

In the compensation period (b), the one ends of the capacitance elements C0 to C9 are maintained at the power supply potential VL by the selection circuits 510 to 519, and the one end of the capacitance element Cser and the other ends of the capacitance elements C0 to C4 are maintained at the power supply potential Vrst due to the ON state of the switch Rsw. In addition, in the compensation period (b) of the i-th row, the OFF state of the transistor 124 and the ON state of the transistor 125 continue from the initialization period (a) in each pixel circuit 110 in the i-th row.

The power supply potential Vrst is set to an average threshold equivalent potential of the transistors 121 in the respective columns. Thus, at the final part of the compensation period (b), the voltages across both ends of the capacitance elements C0 to C4 and the voltages across both ends of the capacitance elements C5 to C9 are substantially the same. Thus, in the compensation period (b), it may be conceivable that charges corresponding to the capacitance values are accumulated in the capacitance elements C0 to C9.

After the compensation period (b) is finished, the writing period (c) starts. The writing period (c) is a period for changing the potential of the gate node g of each transistor 121 from the threshold equivalent potential (Vel−Vth) by a voltage corresponding to a luminance in the pixel circuits 110 in the n columns located in the i-th row.

Figure 10:
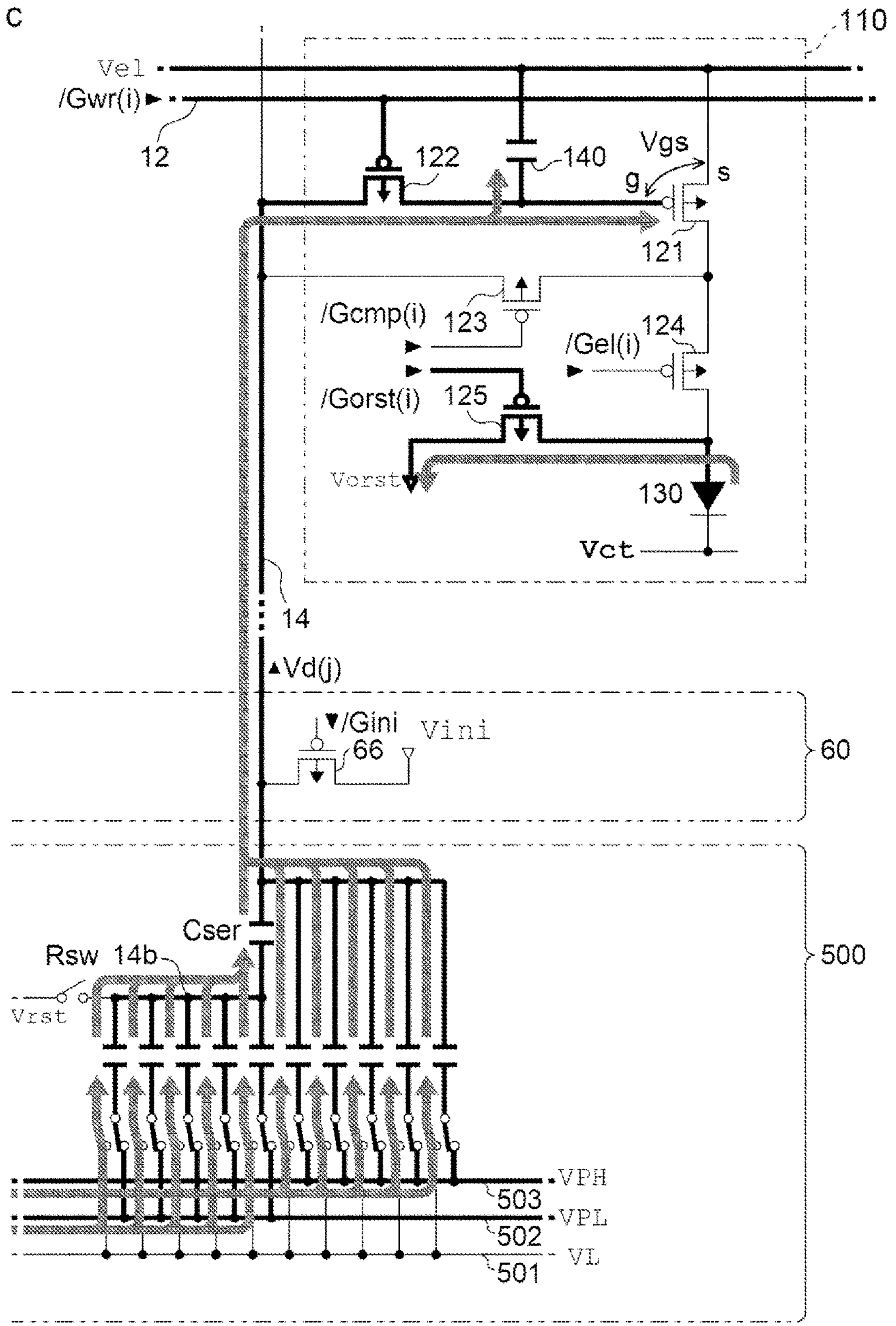
FIG. 10 is a diagram for describing an operation of the electro-optical device.

FIG. 10 is a diagram for describing an operation of the pixel circuit 110 in the i-th row and the j-th column and the D/A converter circuit 500 corresponding to the data line 14 in the j-th column in the writing period (c) of the i-th row.

In the writing period (c), since the control signal /Rst becomes at the H level, the switch Rsw is brought into the OFF state. Further, in the writing period (c), as illustrated in FIG. 7, after the control signal Enb0 becomes at the H level, each of the control signals Enb1 to Enb9 becomes at the H level while sequentially delayed by the time ΔT. When the control signal Enb0 changes from the H level to the L level, each of the control signals Enb1 to Enb9 becomes at the L level while sequentially delayed by the time ΔT. Note that the writing period (c) is finished at a timing when all of the control signals Enb0 to Enb9 are at the H level and before the control signal Enb0 changes from the H level to the L level.

The period in which the bit D0 of the video data output from the second latching circuit L2 in the j-th column is input to the level shifter Ls of the selection circuit 510 is limited to a period in which the control signal Enb0 is made at the H level by the AND circuit Ds. Similarly, the period in which the bits D1 to D9 are sequentially input to the level shifters Ls in the selection circuits 511 to 519 is limited to a period in which the control signals Enb1 to Enb9 are made at the H level by the AND circuits Ds. Thus, the bits D0 to D9 are not simultaneously input to the selection circuits 510 to 519, but each of these bits is input while sequentially delayed by the time ΔT.

Among the selection circuits 510 to 514, a selection circuit in which the bit input to the level shifter Ls is "1" selects the power supply potential VPL, and a selection circuit in which the bit is "0" selects the power supply potential VL. Among the selection circuits 515 to 519, a selection circuit in which the bit input to the level shifter Ls is "1" selects the power supply potential VPH, and a selection circuit in which the bit is "0" selects the power supply potential VL.

In the writing period (c), among the capacitance elements C0 to C9, the potential at the one end of the capacitance element corresponding to the bit of "0" input to the level shifter Ls does not change from the potential in the compensation period (b), and thus does not contribute to an increase in the potential of the data line 14.

Among the capacitance elements C5 to C9 corresponding to the upper 5 bits, the potential at the one end of the capacitance element corresponding to the bit of "1" input to the level shifter Ls changes from the power supply potential VL to the power supply potential VPH in the writing period (c). Thus, among the capacitance elements C5 to C9, the capacitance element corresponding to the bit of "1" increase the potential of the data line 14 from the threshold equivalent potential in the compensation period (b) by an amount corresponding to the weight of the capacitance value.

Among the capacitance elements C0 to C4 corresponding to the lower 5 bits, the potential at the one end of the capacitance element corresponding to the bit of "1" input to the level shifter Ls changes from the power supply potential VL to the power supply potential VPL in the writing period (c). However, unlike the other ends of the capacitance elements C5 to C9, the other ends of the capacitance elements C0 to C4 are coupled to the data line 14 via the capacitance element Cser. Thus, the amount of change from the power supply potential VL to the power supply potential VPL at the one end of the capacitance element corresponding to the bit of "1" among the capacitance elements C0 to C4 is compressed at the compression ratio k and increases the potential of the data line 14.

As described above, in the writing period (c), the D/A converter circuit 500 in the j-th column increases the potential of the data line 14 in the j-th column from the threshold equivalent potential (Vel−Vth) by a voltage corresponding to the bits D0 to D9 of the video data Vdata in the i-th row and the j-th column, that is, by a voltage specifying the luminance of the OLED in the i-th row and the j-th column.

In the embodiment, the period in which each of the control signals Enb0 to Enb9 becomes at the H level in the writing period (c) is sequentially delayed by the time ΔT. This is because when the control signals Enb0 to Enb9 simultaneously become at the H level, switching from the power supply potential VL to the power supply potential VPL or the power supply potential VPH occurs at the same time, and a spike fluctuation due to the switching increases and propagates to each unit, particularly to the data line 14, and deteriorates the D/A conversion accuracy. Thus, in the embodiment, the phase of each of the control signals Enb0 to Enb9 is sequentially shifted so that switching from the power supply potential VL to VPL or VPH does not occur at the same time.

This lessens an influence of the spike due to the switching, thereby suppressing the deterioration of the DA conversion accuracy. The order in which the control signals Enb0 to Enb9 become at the H level does not need to be the order of the control signals Enb0 to Enb9.

In the writing period (c) of the i-th row, in the pixel circuit 110 in the i-th row and the j-th column, the ON state of the transistor 122 is maintained and the transistor 123 is brought into the OFF state. Thus, the potential of the gate node g of the transistor 121 also increases from the threshold equivalent potential (Vel−Vth) by a voltage corresponding to the bits D0 to D9 of the video data Vdata of the i-th row and the j-th column in a manner similar to the data line 14 in the j-th column.

In addition, in the writing period (c) of the i-th row, the OFF state of the transistor 124 and the ON state of the transistor 125 continue in the pixel circuit 110 in the i-th row.

When the scanning signal /Gwr(i) changes to the H level, the writing period (c) of the i-th row is finished. When the scanning signal /Gwr(i) becomes at the H level, the transistor 122 is brought into the OFF state, but a voltage Vgs between the gate node g and the source node of the transistor 121 is held in the capacitance element 140 in the pixel circuit 110 in the i-th row and the j-th column.

In FIG. 10, the voltage between the gate node g and the source node s is denoted as Vgs. FIG. 10 illustrates a case where all the bits D0 to D9 of the video data output from the second latching circuit L2 are "1".

After the writing period (c) is finished, the light emission period (d) starts. The light emission period (d) is a period for causing a current corresponding to the voltage Vgs held in the writing period (c) to flow through the OLED 130 and the OLED 130 to emit light.

Figure 11:
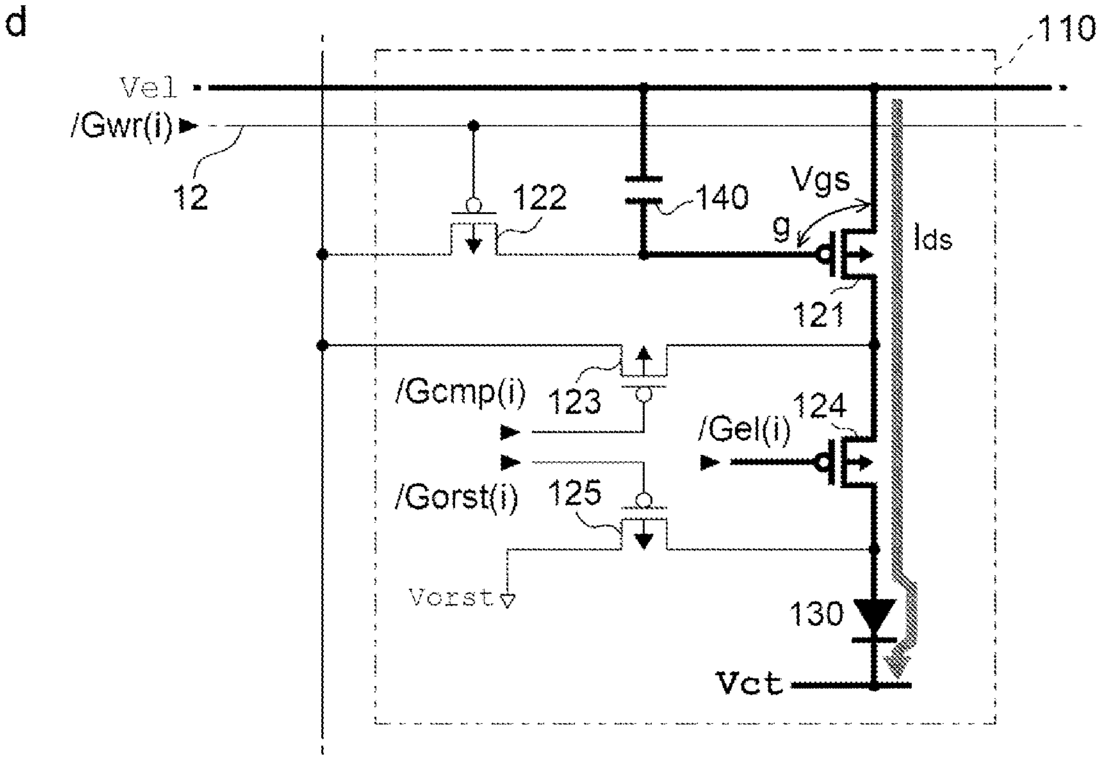
FIG. 11 is a diagram for describing an operation of the electro-optical device.

FIG. 11 is a diagram for describing an operation of the pixel circuit 110 in the i-th row and the j-th column in the light emission period (d) of the i-th row.

Since the control signal /Gorst(i) becomes at the H level before the light emission period (d) of the i-th row, the transistor 125 is brought into the OFF state. In the light emission period (d) of the i-th row, the control signal /Gel(i) is inverted to the L level, so that the transistor 124 is brought into the ON state. Thus, the transistor 121 causes a current Ids corresponding to the voltage Vgs held by the capacitance element 140 to flow through the OLED 130. Thus, the OLED 130 is brought into an optical state corresponding to the current Ids, that is, a state of emitting light at a luminance corresponding to the current Ids.

FIG. 11 illustrates an example in which the light emission period (d) continues after the selection of the scanning line 12 in the i-th row is finished. The period in which the control signal /Gel(i) becomes at the L level may be intermittent or may be adjusted in accordance with luminance adjustment. Further, the level of the control signal /Gel(i) in the light emission period (d) may increase from the L level in the compensation period (b). That is, the level of the control signal /Gel(i) in the light emission period (d) may be an intermediate level between the H level and the L level.

In the light emission period (d) of the i-th row, the D/A converter circuit 500 corresponding to the j-th column may perform an operation of the horizontal scanning period (H) on rows other than the i-th row, and thus the D/A converter circuit 500 is omitted in FIG. 11.

In FIGS. 8 to 10, in the horizontal scanning period (H) of the i-th row, attention has been focused on the D/A converter circuit 500 corresponding to the j-th column and the pixel circuit 110 in the i-th row and the j-th column, but the same operation is performed in the D/A converter circuits 500 and the pixel circuits 110 corresponding to the columns other than the j-th column.

In FIGS. 8 to 11, attention has been focused on the horizontal scanning period (H) of the i-th row and the operation in this horizontal scanning period (H) has been described, but the same operation is sequentially performed in the horizontal scanning periods (H) of the first, second, third, . . . , and m-th rows.

In the pixel circuit 110, the voltage Vgs in the writing period (c) and the light emission period (d) is a voltage changed from the threshold voltage in the compensation period (b) in accordance with the gradation level of the pixel circuit 110. The same operation is performed in the other pixel circuits 110. Thus, in the embodiment, a current corresponding to the gradation level flows through the OLED 130 in a state in which the threshold voltage of the transistor 121 is compensated in each of all the pixel circuits 110 in the m rows and the n columns. Thus, in the embodiment, a variation in luminance is reduced, and as a result, a high-quality display is possible.

Figure 12:
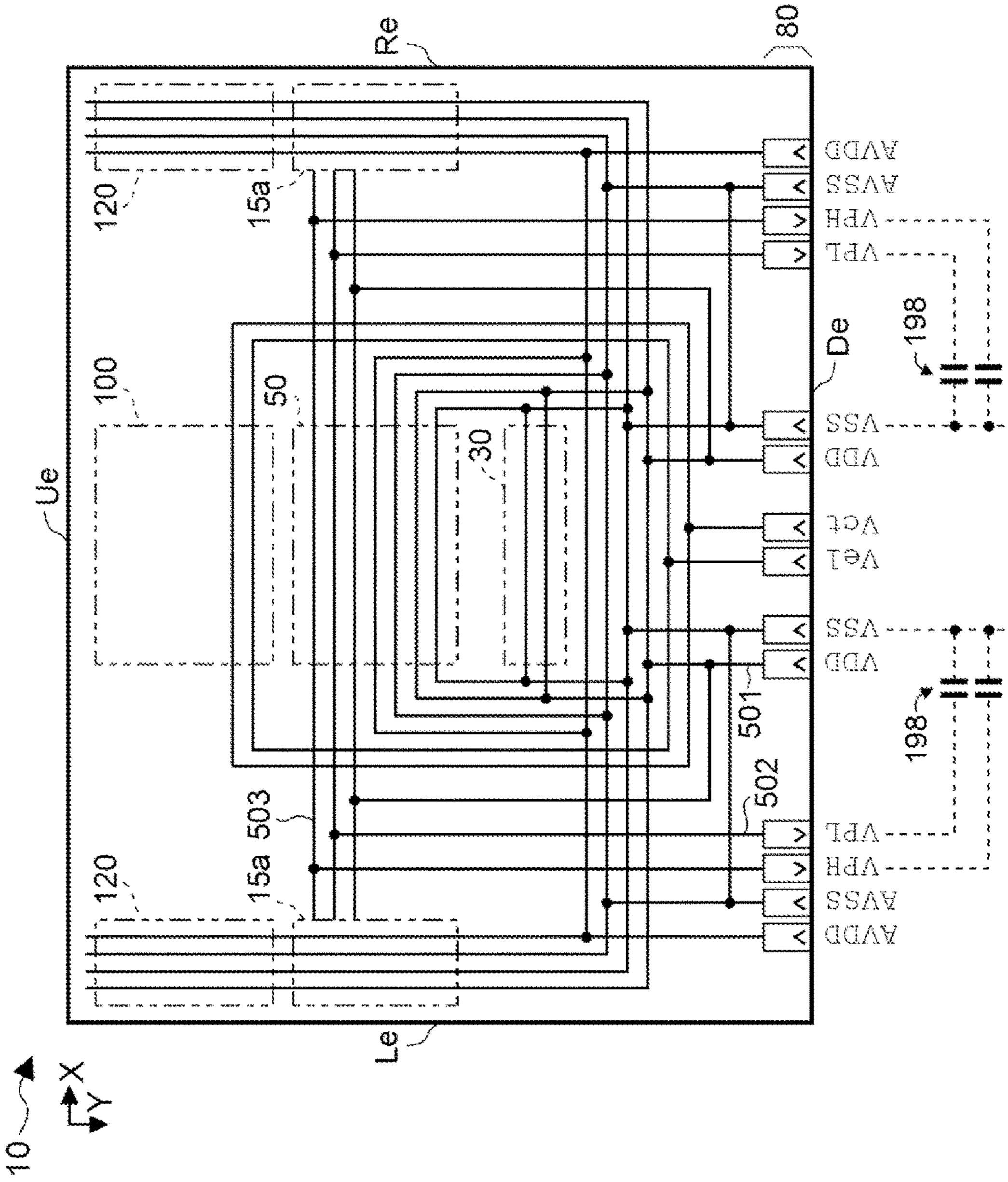
FIG. 12 is a plan view illustrating a power supply wiring line of the electro-optical device.

FIG. 12 is a schematic plan view illustrating a relationship between various circuits and power supply wiring lines in the electro-optical device 10.

The electro-optical device 10 is diced from a wafer-shaped semiconductor substrate, and thus has a rectangular shape. Thus, regarding the electro-optical device 10 having a rectangular shape, the upper side is designated by the reference sign Ue, the lower side is designated by the reference sign De, the left side is designated by the reference sign Le, and the right side is designated by the reference sign Re, as illustrated in the drawing for convenience.

Between the lower side De and the display region 100, the data signal output circuit 50 and the control circuit 30 are provided in this order when viewed from the display region 100. In the electro-optical device 10, a plurality of terminals 80 are provided at the lower side De along the X direction. Although the initialization circuit 60 is actually provided between the display region 100 and the data signal output circuit 50, the initialization circuit 60 does not require a power supply and thus is omitted in FIG. 12.

The scanning line driving circuit 120 is provided between the left side Le and the display region 100, and the power supply circuit 15*a* is provided between the left side Le and the control circuit 30. Similarly, the scanning line driving circuit 120 is provided between the right side Re and the display region 100, and the power supply circuit 15*a* is provided between the right side Re and the control circuit 30.

Since the scanning line driving circuits 120 and the power supply circuits 15*a* are arranged substantially symmetrically with respect to the display region 100 in this manner, a signal delay and a voltage drop due to the resistances of the power supply wiring lines are suppressed as compared with a configuration in which the scanning line driving circuits 120 and the power supply circuits 15*a* are provided asymmetrically only on one side.

In the embodiment, the power supply potentials AVDD, AVSS, VDD, VSS, Vel, and Vct are supplied to the electro-optical device 10 from the outside via the FPC board 194 and the terminals 80. Each power supply circuit 15*a* generates the power supply the potentials VL, VPL, and VPH using the power supply potentials AVSS and AVDD and supplies the power supply potentials VL, VPL, and VPH to the data signal output circuit 50.

The power supply potentials VPL and VPH are output via the data signal output circuit 50 and the terminals 80, and are smoothed by external capacitance elements 198 as indicated by broken lines in the drawing.

The power supply potential VL is the same as the power supply potential VDD, and the power supply potential VDD (=VL) is smoothed by a capacitance element (not illustrated) in the host device and is supplied to the electro-optical device 10. Thus, when one end of the FPC board 194 is coupled to the terminals 80 and the other end of the FPC board 194 is coupled to the host device, the power supply wiring line 501 is electrically coupled to the smoothing capacitance element in the host device, so that a separate capacitance element 198 is not necessary.

The power supply potentials Vel and Vct supplied from the outside via the terminals 80 are supplied to the display region 100.

The scanning line driving circuit 120 generates the scanning signals /Gwr(1) to /Gwr(m) and the control signals /Gcmp(1) to /Gcmp(m), /Gorst(1) to /Gorst(m), and /Gel(1) to /Gel(m) using the power supply potentials AVSS, AVDD, VDD and VSS, and supplies these signals to the display region 100.

In addition, the control circuit 30 generates the control signals Enb0 to Enb9, /Rst, and /Gini using the power supply potentials VDD and VSS, supplies the control signals to the display region 100, and generates, as logical signals, various control signals for controlling the scanning line driving circuit 120 and the data signal output circuit 50.

Figure 18:
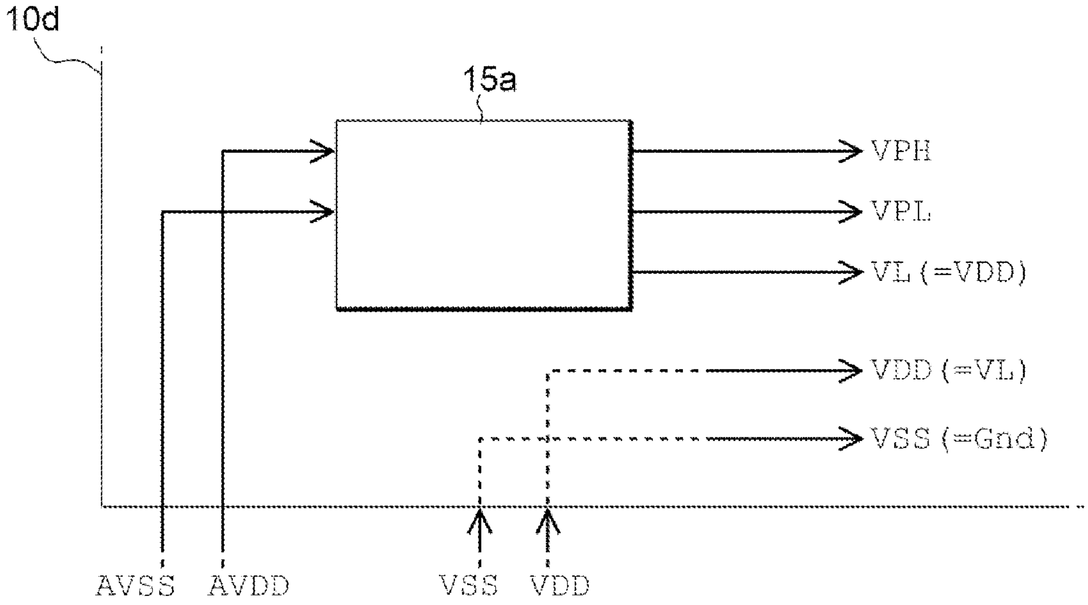
FIG. 18 is a diagram illustrating a configuration of a power supply circuit according to a comparative example.

Here, a configuration according to a comparative example will be described before description of the superiority of the embodiment. FIG. 18 is a diagram illustrating a relationship between power supply potentials generated by a power supply circuit 15*a* of an electro-optical device 10*d* according to the comparative example and power supply potentials supplied from the outside of the electro-optical device 10*d*.

As illustrated in the drawing, the electro-optical device 10*d* according to the comparative example is the same as that of the embodiment in that the power supply potentials AVSS, AVDD, VSS, and VDD are supplied from the outside, and that the power supply circuit 15*a* generates the power supply potentials VL, VPL, and VPH using the power supply potentials AVSS and AVDD.

In the comparative example, unlike the embodiment, the power supply potentials VL and VDD are separate from each other. Thus, in the comparative example, the power supply potentials VL and VDD are not necessarily the same and may be different.

Figure 19:
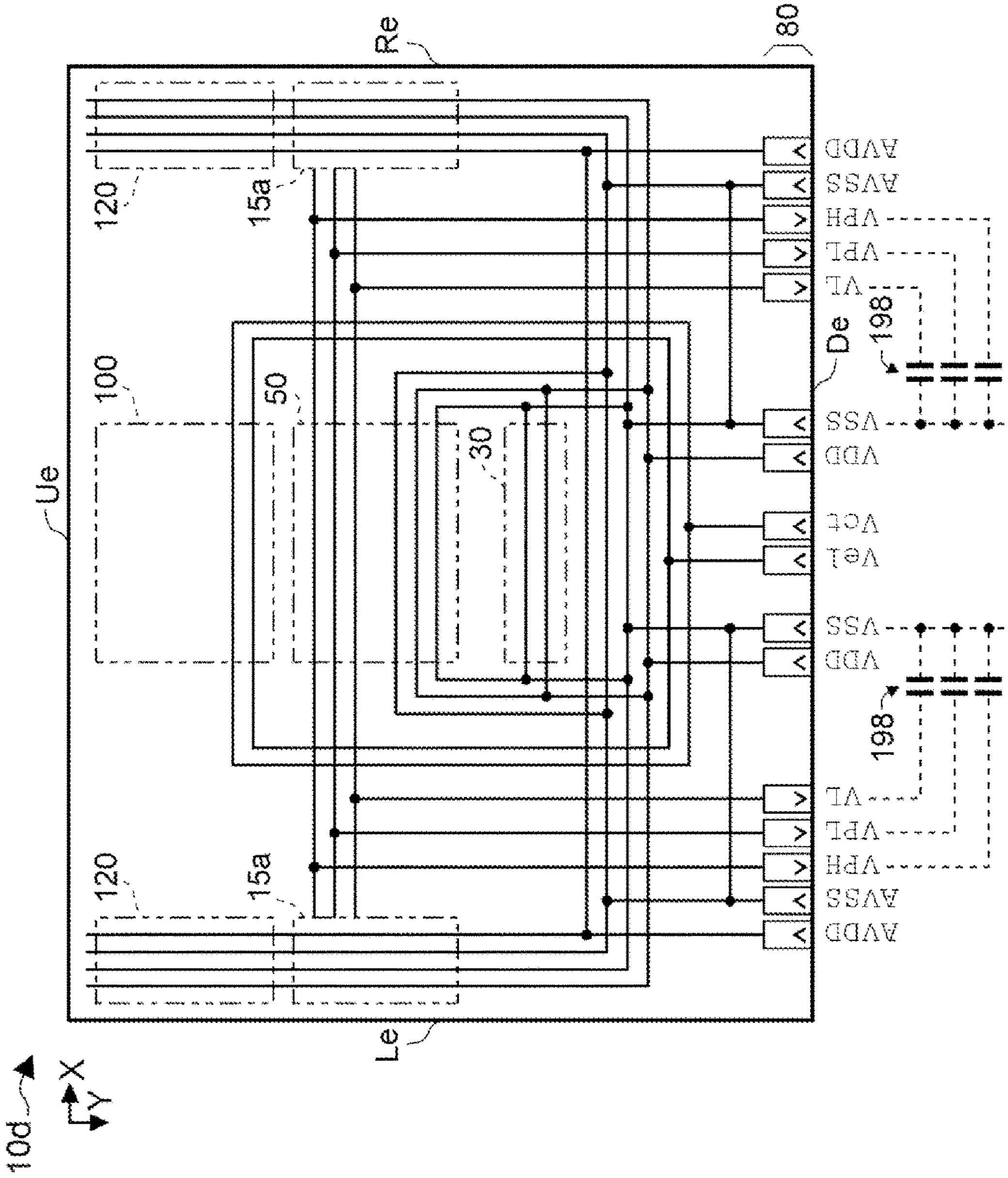
FIG. 19 is a plan view illustrating a power supply wiring line of an electro-optical device according to the comparative example.

FIG. 19 is a schematic plan view illustrating a relationship between various circuits and power supply wiring lines in the electro-optical device 10*d* according to the comparative example. In the comparative example, since the power supply potential VL is separate from the power supply potential VDD, the power supply potential VL generated by the power supply circuit 15*a* needs to be smoothed, and an additional terminal 80 for coupling to an external capacitance element 198 is necessary.

In a configuration in which the electro-optical device is formed at the semiconductor substrate, the need for the additional terminal 80 leads to an increase in the area of the semiconductor substrate, resulting in an increase in cost.

In contrast, the power supply potential VL generated by the power supply circuit 15*a* is the same as the power supply potential VDD and is supplied via the power supply wiring line 501 in the electro-optical device 10 according to the embodiment. Thus, a terminal 80 for smoothing is not necessary. Thus, in the embodiment, an increase in the area of the semiconductor substrate can be suppressed.

It is also possible to have a configuration in which the power supply circuit 15*a* generates the power supply potential VL and supplies the power supply potential VL as the power supply potential VDD to the control circuit 30 and the like without receiving the power supply potential VDD from the outside or a configuration in which the power supply circuit 15*a* supplies the power supply potential VDD supplied from the outside as the power supply potential VL without generating the power supply potential VL. However, in this configuration, when a load fluctuation of the power supply potential VDD used as a logical signal is large, the power supply potential VL that can be supplied to the one ends of the capacitance elements C0 to C9 is affected by the load fluctuation. When the power supply potential VL is affected, the charges accumulated in the capacitance elements C0 to C9 are also affected. This may deteriorate the output characteristics of the D/A converter circuit 500, that is, the linearity of the output voltage with respect to the bits D0 to D9, and cause degradation of display quality due to crosstalk.

In contrast, in the embodiment, since the power supply potential VL generated by the power supply circuit 15*a* is supplied to each unit in the electro-optical device 10 via the power supply wiring line 501 together with the power supply potential VDD supplied from the outside, the power supply potential VL is not easily affected by the load fluctuation. Thus, in the embodiment, the output characteristics of the D/A converter circuit 500 are favorable, and it is possible to suppress degradation in display quality due to crosstalk.

In the first embodiment, the power supply potential VL is an example of a first power supply potential, and the power supply wiring line 501 is an example of a first power supply wiring line. The power supply potential VPL is an example of a second power supply potential, the power supply wiring line 502 is an example of a second power supply wiring line, the power supply potential VPH is an example of a third power supply potential, and the power supply wiring line 503 is an example of a third power supply wiring line.

In the first embodiment, the control circuit 30 is an example of a first circuit and a logic circuit, and the data signal output circuit 50 is an example of a driving circuit.

Next, a second embodiment will be described.

In the above-described first embodiment, the power supply potentials supplied to the one ends of the capacitance elements C0 to C9 are made the same as the power supply potential VL in the reset period, but the power supply potentials when the non-inverted signal output from the corresponding level shifter Ls is at the H level are made the same in the output period.

Figure 13:
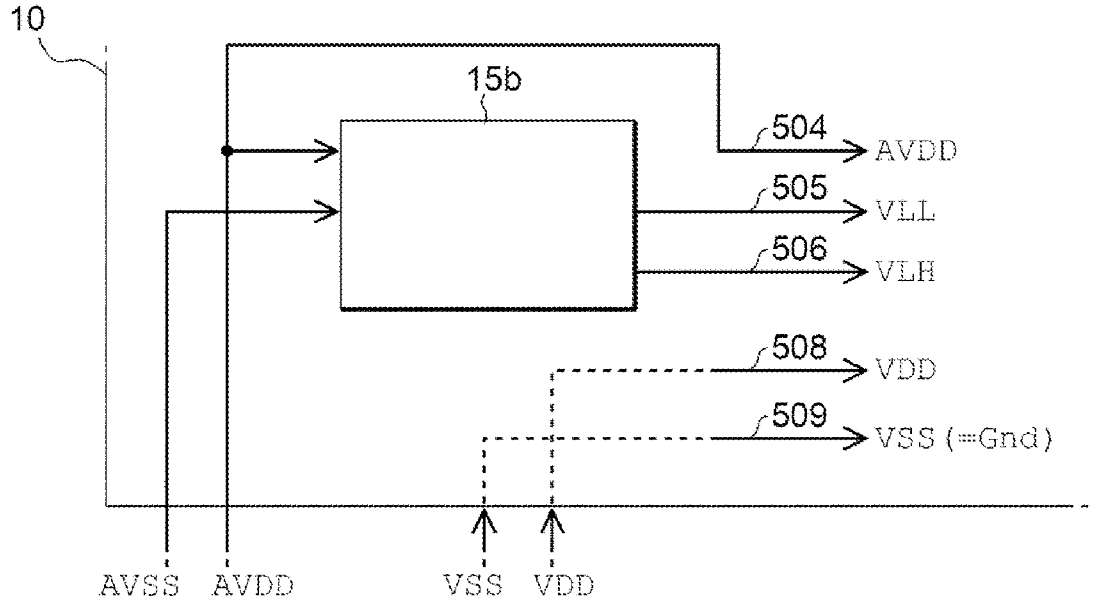
FIG. 13 is a diagram illustrating a power supply circuit of an electro-optical device according to a second embodiment.

FIG. 13 is a diagram illustrating a relationship between power supply potentials generated by a power supply circuit 15*b* of an electro-optical device 10 according to the second embodiment and power supply potentials supplied from the outside of the electro-optical device 10.

As illustrated in this drawing, the electro-optical device 10 is the same as that of the first embodiment in that the power supply potentials AVSS, AVDD, VSS and VDD are supplied from the outside, but the power supply circuit 15*b* generates the power supply potentials VLL and VLH using the power supply potentials AVSS and AVDD. In the electro-optical device 10, the power supply potential AVDD is supplied to a power supply wiring line 504, the power supply potential VLL is supplied to a power supply wiring line 505, and the power supply potential VLH is supplied to a power supply wiring line 506. These power supply potentials AVDD, VLL and VLH are used in the D/A converter circuit 500.

In the second embodiment, the power supply potential AVDD is, for example, 6.0 volts, the power supply potential VLL is, for example, 4.8 volts, and the power supply potential VLH is, for example, 3.1 volts.

In the second embodiment, the power supply potentials VDD and VSS are only supplied from the outside and are not generated by the power supply circuit 15*b*. In the second embodiment, the power supply potential VDD is supplied to the control circuit 30 and the like via a power supply wiring line 508, and the power supply potential VSS is supplied to the control circuit 30 and the like via a power supply wiring line 509.

Thus, in the second embodiment, since the power supply wiring lines 504, 505, and 506 are spaced apart from the power supply wiring lines 508 and 509, the power supply potentials AVDD, VLL, and VPH used in the D/A converter circuit 500 are not easily affected by the power supply potentials VDD and VSS used as logical signals in the electro-optical device 10.

Figure 14:
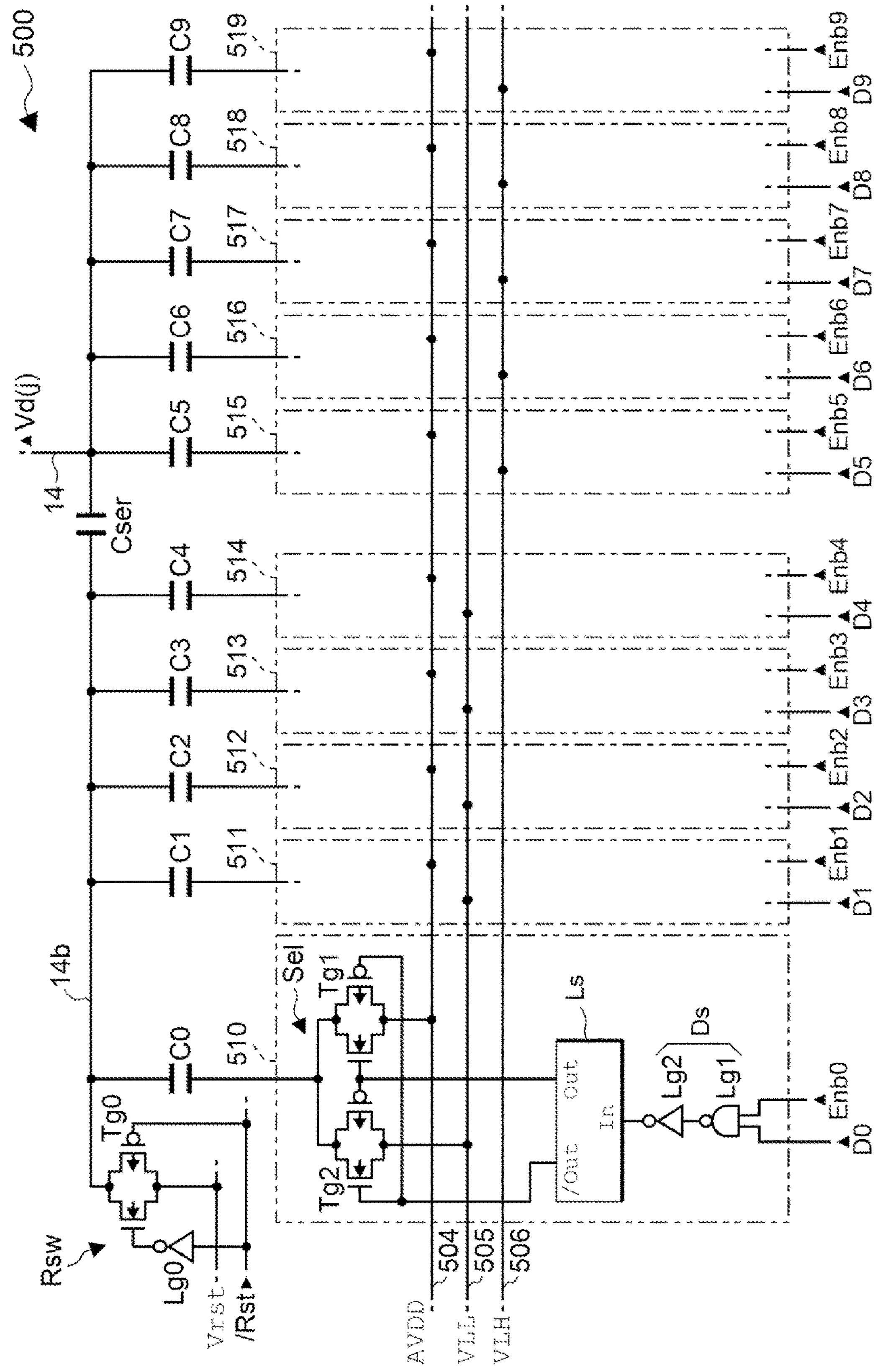
FIG. 14 is a circuit diagram illustrating a configuration of a D/A converter circuit of the electro-optical device.

FIG. 14 is a circuit diagram illustrating the D/A converter circuit 500 of the electro-optical device 10 according to the second embodiment.

As illustrated in this drawing, in the second embodiment, the power supply potential AVDD is supplied to the one end of each of the capacitance elements C0 to C9 when the non-inverted signal output from the level shifter Ls of the corresponding bit is at the H level.

The one end of each of the capacitance elements C0 to C4 corresponding to the lower 5 bits is supplied with the power supply potential VLL when the non-inverted signal output from the level shifter Ls of the corresponding bit is at the L level, and the one end of each of the capacitance elements C5 to C9 corresponding to the upper 5 bits is supplied with the power supply potential VLH when the non-inverted signal output from the level shifter Ls of the corresponding bit is at the L level.

In the second embodiment, although a power supply of the level shifter Ls is not particularly illustrated, a high power supply potential is the power supply potential AVDD and a low power supply potential is the power supply potential VLH (or VSS). Thus, in the second embodiment, the H level of the non-inverted signal or the inverted signal output from the level shifter Ls is the power supply potential AVDD, and the L level thereof is the power supply potential VLH (or VSS).

In the second embodiment, the voltage change from the reset period to the output period at the one end of each of the lower capacitance elements C0 to C4 is (AVDD−VLL) when the corresponding bit is “1”, and the voltage change from the reset period to the output period at the one end of each of the upper capacitance elements C5 to C9 is (AVDD−VLH) when the corresponding bit is “1”.

When the corresponding bit is “0”, the voltage change from the reset period to the output period at the one end of each of the capacitance elements C0 to C9 is zero.

As described above, in the second embodiment, the power supply potential AVDD is 6.0 volts, the power supply potential VLL is 4.8 volts, and the power supply potential VLH is 3.1 volts.

Thus, in the second embodiment, the voltage change (AVDD−VLL) at the one end of each of the lower capacitance elements C0 to C4 when the corresponding bit is “1” is 1.2 volts, which is the same as the voltage change (VPL−VL) in the first embodiment.

In the second embodiment, the voltage change (AVDD−VLH) at the one end of each of the upper capacitance elements C5 to C9 when the corresponding bit is “1” is 2.9 volts, which is the same as the voltage change (VPH−VL) in the first embodiment.

Thus, in the D/A converter circuit 500 according to the second embodiment, the power supply potential supplied to the one ends of the capacitance elements C0 to C9 is different from that in the first embodiment, but the voltage change is the same. Thus, the same operation as that of the first embodiment is performed.

Figure 15:
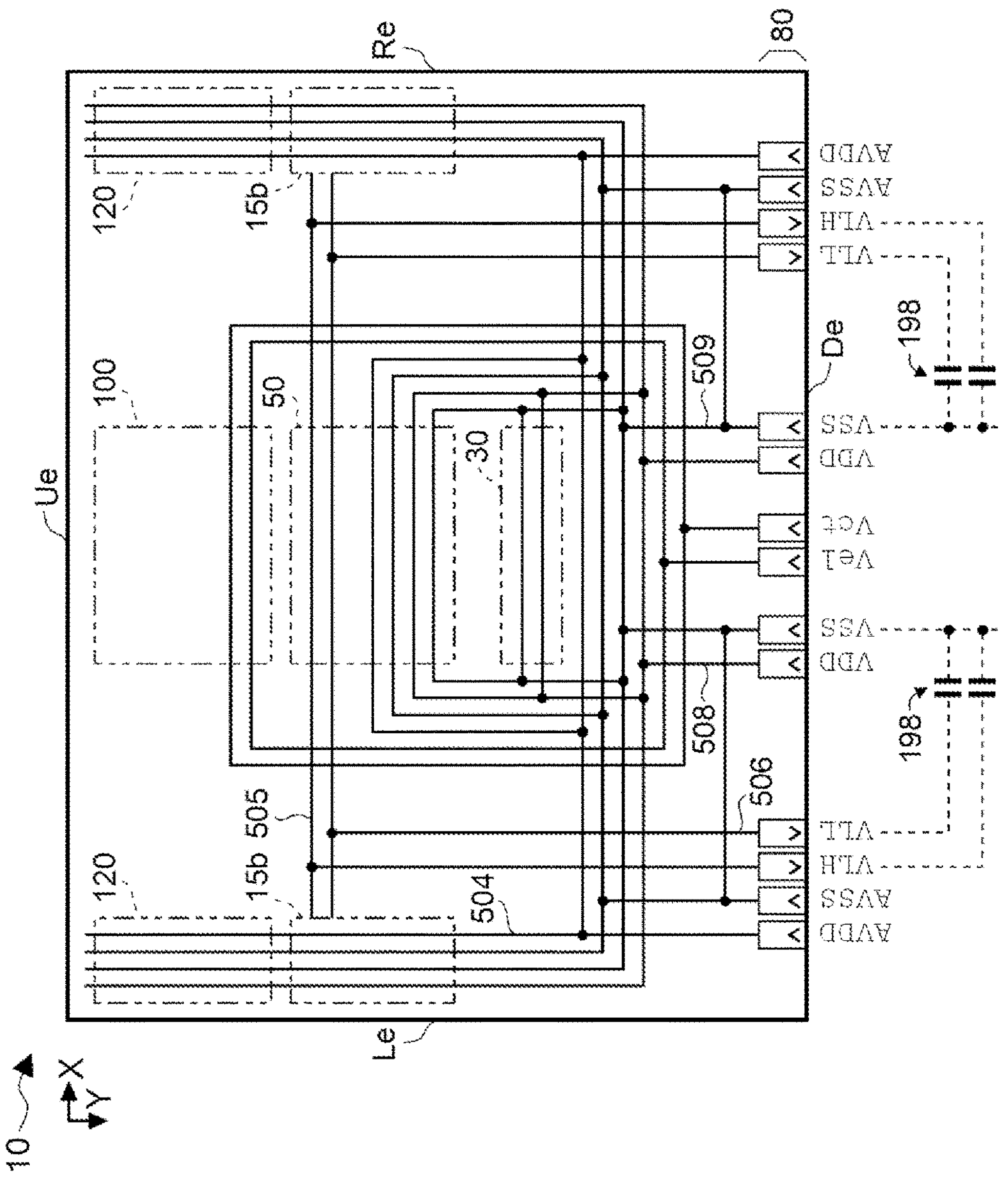
FIG. 15 is a plan view illustrating a power supply wiring line of the electro-optical device.

FIG. 15 illustrates a schematic plan view illustrating a relationship between various circuits and power supply wiring lines in the electro-optical device 10 according to the second embodiment.

In the second embodiment, since the power supply potential AVDD supplied from the outside is supplied to the D/A converter circuit 500, the number of output lines of the power supply circuit 15*b* is reduced from three of the power supply circuit 15*a* to two. Further, in the second embodiment, since the power supply potential VLH used for the D/A conversion and the power supply potential VDD used as the logic signal are separate from each other, it is not necessary to couple the power supply potential VL used for the D/A conversion and the power supply potential VDD used as the logic signal as in the first embodiment.

In the second embodiment, since the power supply potential AVDD used for the D/A conversion is supplied from the outside in a manner similar to the power supply potential AVDD in the first embodiment, a separate terminal is not required. Thus, in the second embodiment as well, an increase in the area of the semiconductor substrate can be suppressed.

In the second embodiment, the power supply potentials AVDD, VLL, and VLH used for the D/A conversion are separate from the power supply potential VDD used as the H level of the logic signal and the power supply potential VSS used as the L level of the logic signal.

Thus, even when load fluctuations of the power supply potentials VDD and VSS used as the logic signals are large, the power supply potentials AVDD, VLL, and VLH used for the D/A conversion are not easily affected by the load fluctuations. Thus, in the second embodiment as well, the output characteristics of the D/A converter circuit 500 are favorable, and it is possible to suppress degradation in display quality due to crosstalk.

In the second embodiment, the power supply potential AVDD is an example of the first power supply potential, and the power supply wiring line 504 is an example of the first power supply wiring line. The power supply potential VLL is an example of the second power supply potential, the power supply wiring line 505 is an example of the second power supply wiring line, the power supply potential VLH is an example of the third power supply potential, and the power supply wiring line 506 is an example of the third power supply wiring line.

In the second embodiment, for example, the level shifter Ls is an example of the first circuit, the control circuit 30 is an example of the logic circuit, and the data signal output circuit 50 is an example of the driving circuit.

In the first embodiment and the second embodiment described above (hereinafter referred to as “embodiments and the like”), various modifications or applications are possible as follows.

The D/A converter circuit 500 according to the above-described various embodiments and the like is configured such that the 10 bits are divided into the upper bits D5 to D9 and the lower bits D0 to D4, the upper bits D5 to D9 are converted by the upper D/A converter circuit unit Upb and directly output to the data line 14, and the lower bits D0 to D4 are converted by the lower D/A converter circuit unit Lwb and output to the data line 14 via the capacitance element Cser. However, the number of bits to be converted is only required to be two or more.

In the embodiments and the like, the OLED 130 has been described as an example of the light-emitting element, but other light-emitting elements may be used. Examples of the light-emitting element may include an LED, a mini LED, and a micro LED. Instead of the light-emitting element, a liquid crystal element may be used as the display element. Even when the liquid crystal element is used, it is necessary to supply a data signal having a voltage corresponding to a luminance. Thus, the above-described D/A converter circuit 500 is applied to the electro-optical device 10 according to the embodiments and the like.

That is, the light-emitting element or the liquid crystal element is only required to be an electro-optical element brought into an optical (brightness) state corresponding to the voltage of the data signal output from the D/A converter circuit 500.

The channel type of the transistors 66 and 121 to 125 is not limited to that in the embodiments and the like. Further, these transistors 66 and 121 to 125 may be appropriately replaced with transmission gates. Conversely, the transmission gates Tg0 to Tg2 may be replaced with transistors of one channel type.

Next, an electronic apparatus to which the electro-optical device 10 according to the above-described embodiments is applied will be described. The electro-optical device 10 is suitable for a device including small pixels and displaying a high-definition image. Thus, a head-mounted display will be described as an example of the electronic apparatus.

Figure 16:
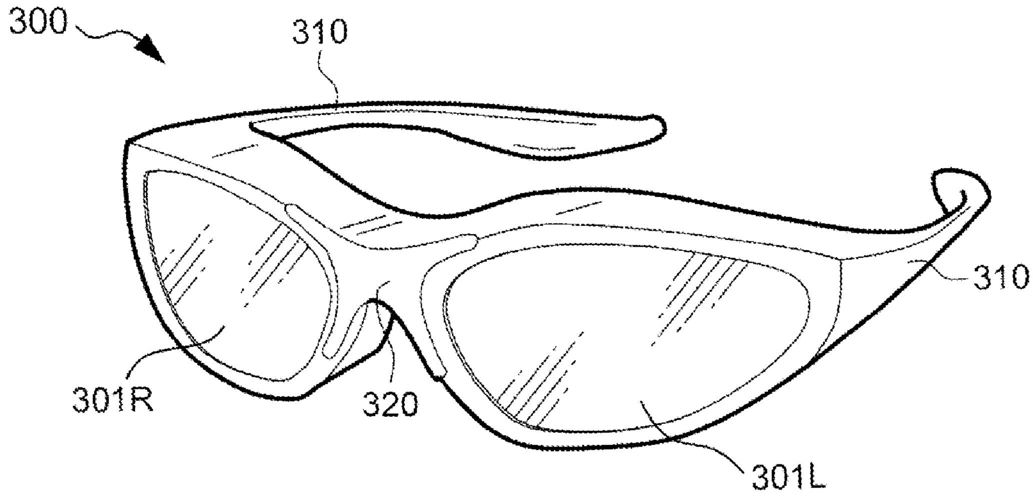
FIG. 16 is a perspective view illustrating a head-mounted display including the electro-optical device.
Figure 17:
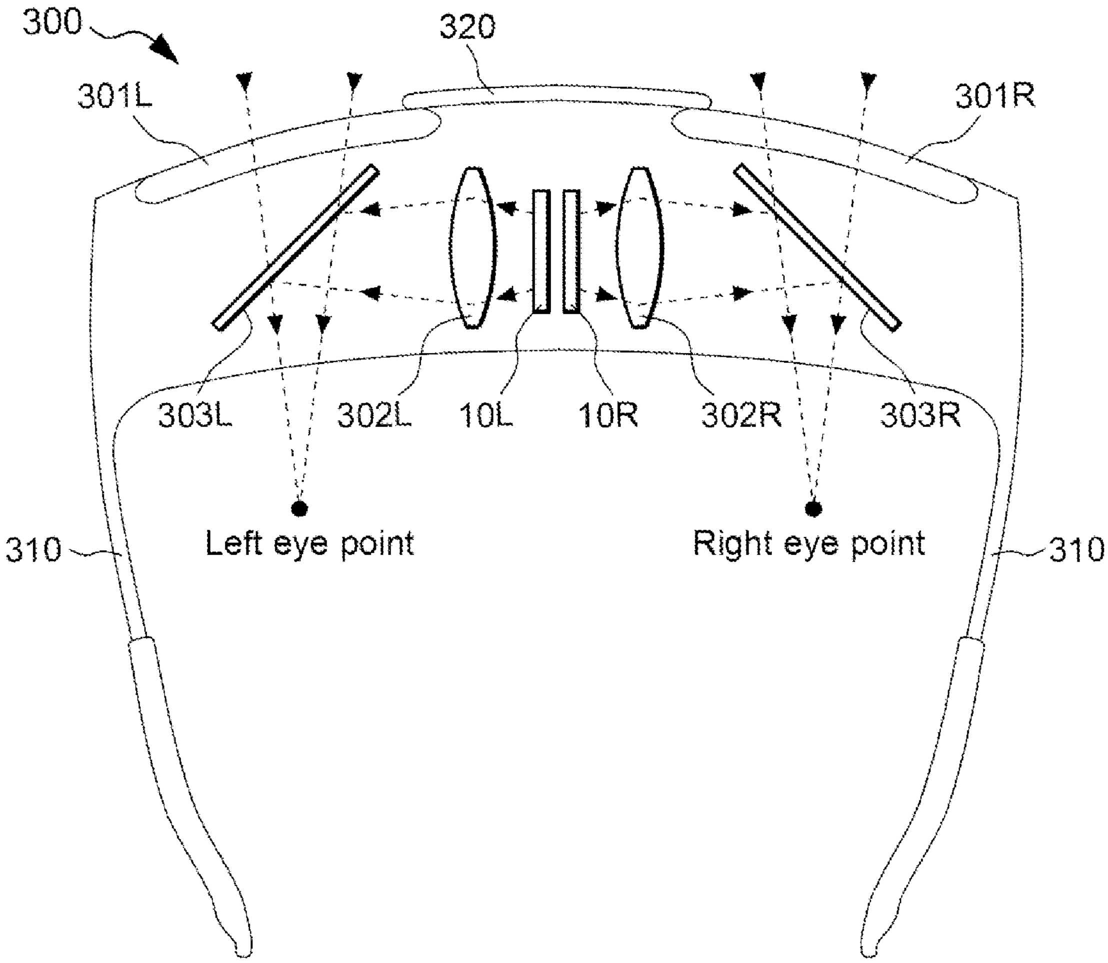
FIG. 17 is a diagram illustrating an optical configuration of the head-mounted display.

FIG. 16 is a view illustrating appearance of a head-mounted display, and FIG. 17 is a view illustrating an optical configuration of the head-mounted display.

First, as illustrated in FIG. 16, a head-mounted display 300 includes, in terms of exterior, temples 310, a bridge 320, and lenses 301L and 301R, similar to typical eyeglasses. In addition, as illustrated in FIG. 17, in the head-mounted display 300, an electro-optical device 10L for a left eye and an electro-optical device 10R for a right eye are provided in the vicinity of the bridge 320 and at the back (downward in the drawing) of the lenses 301L and 301R.

An image display surface of the electro-optical device 10L is disposed to be on the left side in FIG. 17. Thus, a display image by the electro-optical device 10L is output via an optical lens 302L in a 9-o'clock direction in the drawing. A half mirror 303L reflects the display image by the electro-optical device 10L in a 6-o'clock direction, while the half mirror 303L transmits light incident in a 12-o'clock direction. An image display surface of the electro-optical device 10R is disposed on the right side opposite to the electro-optical device 10L. Thus, the display image by the electro-optical device 10R is output via an optical lens 302R in a 3-o'clock direction in the drawing. A half mirror 303R reflects the display image by the electro-optical device 10R in a 6-o'clock direction, while the half mirror 303R transmits light incident in a 12-o'clock direction.

In this configuration, a wearer of the head-mounted display 300 can observe the display images by the electro-optical devices 10L and 10R in a see-through state in which the display images by the electro-optical devices 10L and 10R overlap the outside.

In addition, in the head-mounted display 300, in the images for both eyes with parallax, an image for a left eye is displayed on the electro-optical device 10L, and an image for a right eye is displayed on the electro-optical device 10R, and thus, it is possible to cause the wearer to sense the displayed images as an image displayed having a depth or a three-dimensional effect.

In addition to the head-mounted display 300, the electronic apparatus including the electro-optical device 10 can be applied to an electronic viewing finder in a video camera, a lens-exchangeable digital camera, or the like, a mobile information terminal, a wristwatch display, a light valve for a projection type projector, and the like.

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

An electro-optical device (10) according to a first aspect includes a driving circuit (500) including a D/A converter circuit, a plurality of terminals (80), a first circuit (30/Ls) supplied with a first power supply potential (VL/AVDD) from at least one terminal of the plurality of terminals (80) via a first power supply wiring line (501/504), and a power supply circuit (15*a*/15*b*) configured to generate a second power supply potential (VPL/VLL) different from the first power supply potential (VL/AVDD) in accordance with potentials supplied via two or more terminals of the plurality of terminals (80) and supply the second power supply potential (VPL/VLL) to a second power supply wiring line (502/505), wherein the D/A converter circuit (50) includes a plurality of capacitance elements (C0 to C9), and the first power supply wiring line (501/504) or the second power supply wiring line (502/505) is selectively coupled to one portion (C0 to C4) of the plurality of capacitance elements (C0 to C9).

According to the first aspect, it is possible to keep favorable output characteristics of the D/A converter circuit without increasing in the area of the semiconductor substrate.

In an electro-optical device (10) according to a second aspect being a specific aspect of the first aspect, the first circuit is a logic circuit (30) configured to supply a control signal to the driving circuit (50), and the first power supply potential (VL) corresponds to a high level in the logic circuit (30).

According to the second aspect, even when a load fluctuation occurs when the logic signal output from the logic circuit (30) is at the H level, an influence on the output characteristics of the D/A converter circuit is reduced.

In an electro-optical device (10) according to a third aspect being a specific aspect of the second aspect, the power supply circuit generates the first power supply potential (VL) and supplies the first power supply potential (VL) to the first power supply wiring line (501), and generates a third power supply potential (VPH) different from the first power supply potential (VL) and the second power supply potential (VPL) and supplies the third power supply potential (VPH) to a third power supply wiring line (503), and the first power supply wiring line (501) or the third power supply wiring line (503) is selectively coupled to the other portion of the plurality of capacitance elements (C5 to C9) other than the one portion of the plurality of capacitance elements (C0 to C9).

In an electro-optical device (10) according to a fourth aspect being a specific aspect of the third aspect, the D/A converter circuit (500) includes a lower D/A converter circuit unit (Lwb) and an upper D/A converter circuit unit (Upb), a capacitance element included in the lower D/A converter circuit unit (Lwb) is the one portion (C0 to C4) of the plurality of capacitance elements, and a capacitance element included in the upper D/A converter circuit unit (Upb) is the other portion of the plurality of capacitance elements (C5 to C9) other than the one portion of the plurality of capacitance elements.

In an electro-optical device (10) according to a fifth aspect being another specific aspect of the first aspect, the power supply circuit (15*b*) generates a third power supply potential (VLH) different from the first power supply potential (AVDD) and the second power supply potential (VLL) and supplies the third power supply potential (VLH) to a third power supply wiring line (506), and the first power supply wiring line (504) or the third power supply wiring line (506) is selectively coupled to the other portion of the plurality of capacitance elements (C5 to C9) other than the one portion (C0 to C4) of the plurality of capacitance elements (C0 to C9).

In an electro-optical device (10) according to a sixth aspect being a specific aspect of the fifth aspect, the D/A converter circuit (500) includes a lower D/A converter circuit unit (Lwb) and an upper D/A converter circuit unit (Upb), a capacitance element included in the lower D/A converter circuit unit (Lwb) is the one portion (C0 to C4) of the plurality of capacitance elements, and a capacitance element included in the upper D/A converter circuit unit (Upb) is the other portion of the plurality of capacitance elements (C5 to C9) other than the one portion of the plurality of capacitance elements.

In an electro-optical device (10) according to a seventh aspect being a specific aspect of the sixth aspect, the first circuit is a logic circuit (30) configured to supply a control signal to the driving circuit (50), wherein a power supply wiring line through which power is supplied to the logic circuit (30) is electrically spaced apart from the first power supply wiring line (504), the second power supply wiring line (505), and the third power supply wiring line (506).

An electro-optical device (10) according to an eighth aspect being a specific aspect of any of the first to seventh aspects includes a pixel circuit (110) including a light-emitting element (130), wherein in the pixel circuit (110), a current corresponding to a voltage output from the D/A converter circuit (500) is supplied to the light-emitting element (130).

An electronic apparatus (300) according to a ninth aspect includes the electro-optical device (10) according to the eighth aspect.

What is claimed is:

1. An electro-optical device comprising:

a driving circuit including a D/A converter circuit;

a plurality of terminals;

a first circuit supplied with a first power supply potential from at least one terminal of the plurality of terminals via a first power supply wiring line; and a power supply circuit configured to generate a second power supply potential different from the first power supply potential in accordance with potentials supplied via two or more terminals of the plurality of terminals and supply the second power supply potential to a second power supply wiring line, wherein the D/A converter circuit includes a plurality of capacitance elements and the first power supply wiring line or the second power supply wiring line is selectively coupled to one portion of the plurality of capacitance elements.

2. The electro-optical device according to claim 1, wherein the first circuit is a logic circuit configured to supply a control signal to the driving circuit and the first power supply potential corresponds to a high level in the logic circuit.

3. The electro-optical device according to claim 2, wherein the power supply circuit:

generates the first power supply potential and supplies the first power supply potential to the first power supply wiring line and generates a third power supply potential different from the first power supply potential and the second power supply potential and supplies the third power supply potential to a third power supply wiring line and the first power supply wiring line or the third power supply wiring line is selectively coupled to the other portion of the plurality of capacitance elements other than the one portion of the plurality of capacitance elements.

4. The electro-optical device according to claim 3, wherein the D/A converter circuit includes a lower D/A converter circuit unit and an upper D/A converter circuit unit, a capacitance element included in the lower D/A converter circuit unit is the one portion of the plurality of capacitance elements, and a capacitance element included in the upper D/A converter circuit unit is the other portion of the plurality of capacitance elements other than the one portion of the plurality of capacitance elements.

5. The electro-optical device according to claim 1, wherein the power supply circuit generates a third power supply potential different from the first power supply potential and the second power supply potential and supplies the third power supply potential to a third power supply wiring line and the first power supply wiring line or the third power supply wiring line is selectively coupled to the other portion of the plurality of capacitance elements other than the one portion of the plurality of capacitance elements.

6. The electro-optical device according to claim 5, wherein the D/A converter circuit includes a lower D/A converter circuit unit and an upper D/A converter circuit unit, a capacitance element included in the lower D/A converter circuit unit is the one portion of the plurality of capacitance elements, and a capacitance element included in the upper D/A converter circuit unit is the other portion of the plurality of capacitance elements other than the one portion of the plurality of capacitance elements.

7. The electro-optical device according to claim 5, further comprising a logic circuit configured to supply a control signal to the driving circuit, wherein a power supply wiring line through which power is supplied to the logic circuit is electrically spaced apart from the first power supply wiring line, the second power supply wiring line, and the third power supply wiring line.

8. The electro-optical device according to claim 1, further comprising a pixel circuit including a light-emitting element, wherein in the pixel circuit, a current corresponding to a voltage output from the D/A converter circuit is supplied to the light-emitting element.

9. An electronic apparatus comprising the electro-optical device according to claim 8.

* * * * *